US012614995B2

(12) United States Patent
Miller

(10) Patent No.: US 12,614,995 B2
(45) Date of Patent: Apr. 28, 2026

(54) SHARED-LEG VOLTAGE SOURCE INVERTER

(71) Applicant: INTUITIVE SURGICAL OPERATIONS, INC., Sunnyvale, CA (US)

(72) Inventor: Daniel N. Miller, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 57 days.

(21) Appl. No.: 18/289,647

(22) PCT Filed: May 11, 2022

(86) PCT No.: PCT/US2022/028763
§ 371 (c)(1),
(2) Date: Nov. 6, 2023

(87) PCT Pub. No.: WO2022/240986
PCT Pub. Date: Nov. 17, 2022

(65) Prior Publication Data
US 2024/0243675 A1 Jul. 18, 2024

Related U.S. Application Data

(60) Provisional application No. 63/187,201, filed on May 11, 2021.

(51) Int. Cl.
H02P 5/56 (2016.01)

(52) U.S. Cl.
CPC ...................................... H02P 5/56 (2016.02)

(58) Field of Classification Search
CPC ...... H02P 5/56; H02P 5/68; H02P 6/04; H02P 27/08; H02P 27/04; H02P 27/06
See application file for complete search history.

(56) References Cited

U.S. PATENT DOCUMENTS

2021/0305920 A1* 9/2021 Tang ................. H02M 7/53871

FOREIGN PATENT DOCUMENTS

| CN | 106849794 A | * | 6/2017 | .......... H02P 21/0003 |
| CN | 106788097 B | * | 6/2020 | |
| EP | 3272002 A1 | | 1/2018 | |

(Continued)

OTHER PUBLICATIONS

International Preliminary Report on Patentability for Application No. PCT/US2022/028763, mailed Nov. 23, 2023, 08 pages.

(Continued)

*Primary Examiner* — Bickey Dhakal
(74) *Attorney, Agent, or Firm* — Jones Burke, PLLC

(57) ABSTRACT

A system includes a first motor, a second motor, and a third motor, each respective motor comprising three phases. The system further includes a voltage source inverter circuit comprising multiple respective inverter legs. Each respective inverter leg coupled to drive at least one phase of at least one of the respective motors, with a first shared inverter leg coupled to drive a third phase of the first motor and drive a first phase of the second motor. A second shared inverter leg is coupled to drive a third phase of the second motor and a first phase of the third motor.

20 Claims, 18 Drawing Sheets

(56) References Cited

FOREIGN PATENT DOCUMENTS

WO      WO-2019141086 A1      7/2019

OTHER PUBLICATIONS

International Search Report and Written Opinion for Application No. PCT/US2022/028763, mailed Sep. 20, 2022, 13 pages.

Jones M., et al., "A PWM Method for Seven-leg Inverters Supplying Three Three-phase Motors," IEEE, Jun. 2008, pp. 2902-2908.

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

SHARED-LEG VOLTAGE SOURCE INVERTER

CLAIM OF PRIORITY

This application is a U.S. national stage application under 35 U.S.C. § 371(c) of International PCT Application No. PCT/US2022/08763, filed May 11, 2022, which claims the benefit of priority to U.S. Patent Application Ser. No. 63/187,201, filed on May 11, 2021, the entire contents of each of which are incorporated by reference herein in its entirety.

TECHNICAL FIELD

The disclosure relates in general to electric motors and more particularly to control of phase voltages in electric motors.

BACKGROUND

There are many types of electric motors. Some motors are driven by an alternating current (AC) source and are thus known as AC motors. The AC source supplies current to a stationary stator consisting of one or more coils of wire to produce a rotating magnetic field, which interacts with the magnetic field of a rotor and causes the rotor to move. The magnetic field of the rotor may be produced by permanent magnets (such as with a permanent magnet synchronous machines or brushless direct current motors), electrical windings (such as with induction motors), or through magnetic reluctance (such as with switched or synchronous reluctance motors). The rotor is most commonly a cylinder placed inside a ring-shaped stator but may be a disk (such as in an axial flux motor) or itself a ring which surrounds a cylindrical stator (such as so-called "outrunner" brushless motors). The term "motor" is used in this document to refer to any electric AC motor.

Although technically a stator needs only a single coil to create a rotating magnetic field, and thus spin a rotor, stators usually include many coils, often wound inside slots around steel teeth to increase magnetic permeability. Alternatively, some motors have slotless designs without teeth, though they still have windings with coils. The coils in a motor are divided into groups to form coupled electromagnetic phases. A phase of a stator includes a group of coils that are electrically coupled so that they share the same voltage. Though the most common number of phases is three, higher-power motors sometimes have five or more phases, and one- and two-phase motors are available. The only upper limit to the number of phases is the number of coils and the number of available voltage sources to supply each phase. The stator phase windings are usually connected to a voltage source through a single wire, called a "phase lead," so that, for example, a three-phase motor will have three leads.

Applying a constant voltage to a phase lead of an AC motor will not make it spin much, if at all. The phase voltages must be modulated to produce electromotive torque in a direction tangential to the rotor's axis of rotation. In "synchronous" motors, the voltages are synchronized based on the position of the rotor in a process called "commutation." To commutate a synchronous motor, information about the angular position of the rotor is required. Rotor position usually is determined using either hall-effect sensors or a position sensor such as a digital encoder. In more cost sensitive applications, rotor position may be estimated by sensing a voltage due to back-electro-motive force (back-EMF), sometimes called "sensorless" motor control. Regardless, commutation requires rotor position information of some form.

A motor spins due to the interaction of the electromagnetic field of the rotor and the field created by current flowing through the stator windings. The current that flows through the windings is primarily a function of the voltage difference between the phase leads and is not affected by the voltage of each lead relative to ground. For example, if a two-phase motor has a voltage of 50 V relative to ground applied to one phase and 40 V relative to ground applied to another phase, then the same magnetic field will be generated as if the motor has a voltage of 10 V relative to ground applied to one phase and the other at 0 V relative to ground. In the first example, the average phase voltage is 45 V relative to ground, while in the second example, the average phase voltage is 5 V relative to ground. The difference between the two examples is invisible to the motor. The average voltage of the phases is often referred to as the common mode of the voltages or sometimes the "neutral voltage" or "zero-sequence voltage."

Typically, the voltage of each phase is generated by a "leg" of a voltage-source inverter (VSI) circuit. A typical VSI receives as input a DC bus voltage, a ground, and an indication of a desired duty cycle selected from 0 to 100 percent, and produces as output, a voltage having a value between the bus voltage and ground when averaged over a long enough time period. Most commonly, this output voltage is achieved via sinusoidal pulse-width modulation, although space-vector modulation is also common. The result of both modulation techniques is the same—the voltage applied to the phase of a motor is, when averaged over a given time period (the inverse of the modulation frequency), equal to some desired voltage between the bus voltage and ground. The VSI legs are usually grouped together on a circuit board, or sometimes even inside the same integrated circuit. Thus, a VSI ordinarily provides multiple modulated voltages to the multiple phases of a motor, and each individual voltage is generated by a leg of the VSI. Thus, for example, a typical 3-legged VSI can generate 3 individual modulated voltages with values between the bus voltage and ground.

Generally, each phase of a motor is coupled to a separate leg of a VSI, such that a three-phase motor would typically be driven by a 3-legged VSI. For most applications, both the size and the cost of the VSI are far smaller than those of the motor, and there is little motivation to reduce the physical sized of a VSI. However, in some motor applications, such as miniaturized robotics that contain a plurality of motors, physical size of a VSI can be an important design factor. Dujic et al., "A General PWM Method for a (2n+1)-Leg Inverter Supplying n Three-Phase Machines", *IEEE Transactions on Industrial Electronics*, Vol. 56, No. 10, October 2009, disclose one approach to reducing size of a VSI circuit by electrically coupling a single VSI leg to share a modulated voltage with a phase of each of multiple motors. However, this approach is limited to sharing one common VSI leg with each of the multiple motors and imposes practical constraints. Unfortunately, when a single common VSI leg is shared among N motors, constraints imposed upon the shared VSI leg (in particular, the maximum velocity the motors can achieve) scale by roughly 1/N in the worst case. This is due to the cumulative effects of back-EMF from all motors appearing in a single VSI leg. For example, suppose an application using 5 motors supplied with 15 VSI legs (without VSI leg sharing) has a maximum speed of 100

RPM for each motor due to the voltage limits of the VSI. If all 5 motors are rewired to share a common VSI leg, each of the motors will have a maximum speed of 20 RPM in the worst case.

SUMMARY

In accordance with examples in the present disclosure, a system is provided that includes a first motor, a second motor, and a third motor, each respective motor comprising three phases. The system includes a voltage source inverter circuit includes multiple respective inverter legs. Each inverter leg is coupled to drive at least one phase of at least one of the motors. A first shared inverter leg is coupled to drive a first phase of the first motor and drive third phase of the second motor. A second shared inverter leg is coupled to drive a third phase of the second motor and a first phase of the third motor.

In accordance with examples in the present disclosure, a system is provided that includes a first motor, a second motor, and a third motor, each motor comprising three phases. The system includes a voltage source inverter circuit comprising multiple inverter legs. A commutation control circuit includes a first voltage transformation block to transform first, second and third sets of space vector voltage signals, corresponding to the first, second, and third motors, to multiple phase voltage signals that include a first shared phase signal and a second shared phase signal. A duty cycle block is configured to modulate the first and second shared phase voltage signals and add a common mode voltage value to the first and second shared phase voltage signals to produce corresponding first and second input control signals. A first inverter leg of the voltage source inverter circuit is coupled to impart a first shared excitation signal to a first phase of the first motor and a third phase of the second motor, in response to the first input control signal. A second inverter leg of the voltage source inverter circuit is coupled to impart a second shared excitation signal to a third phase of the second motor and the first phase of the third motor, in response to the second input control signal.

In accordance with examples in the present disclosure, a method is provided comprising: imparting a first shared excitation signal to drive a first phase of a first electric motor and drive third phase of the second electric motor; and imparting a second shared excitation signal to drive a third phase of the second motor and a first phase of the third motor.

In accordance with examples in the present disclosure, a surgical system is provided that includes a manipulator comprising a first link and includes an instrument carriage coupled to the first link. The instrument carriage is configured for detachably mounting an instrument to the instrument carriage. The instrument carriage comprises a motor housing, multiple drive motors, each of the drive motors having at least three phases, each of the drive motors being coupled to the motor housing. The instrument carriage comprises multiple output drive couplings, each of the output drive couplings being operably coupled with a corresponding one of the drive motors, each of the output drive couplings being configured to drivingly couple with a corresponding input drive coupling of the instrument. The instrument carriage comprises a voltage source inverter circuit comprising multiple inverter legs. The voltage source inverter circuit is coupled to the motor housing, and each respective inverter leg coupled to drive at least one phase of at least one of the respective motors. An inverter leg of the multiple inverter legs is coupled to drive a common one of the three phases of each of two of the motors. A different inverter leg of the multiple inverter legs is coupled to drive a different common one of the three phase of each of two of the motors.

The examples in this disclosure provide for a compact VSI circuit without the limiting constraints of Dujic.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in this document.

DETAILED DESCRIPTION

A. Exclusive-Leg VSI and Corresponding Electric Motor and Commutation

Figure 1:
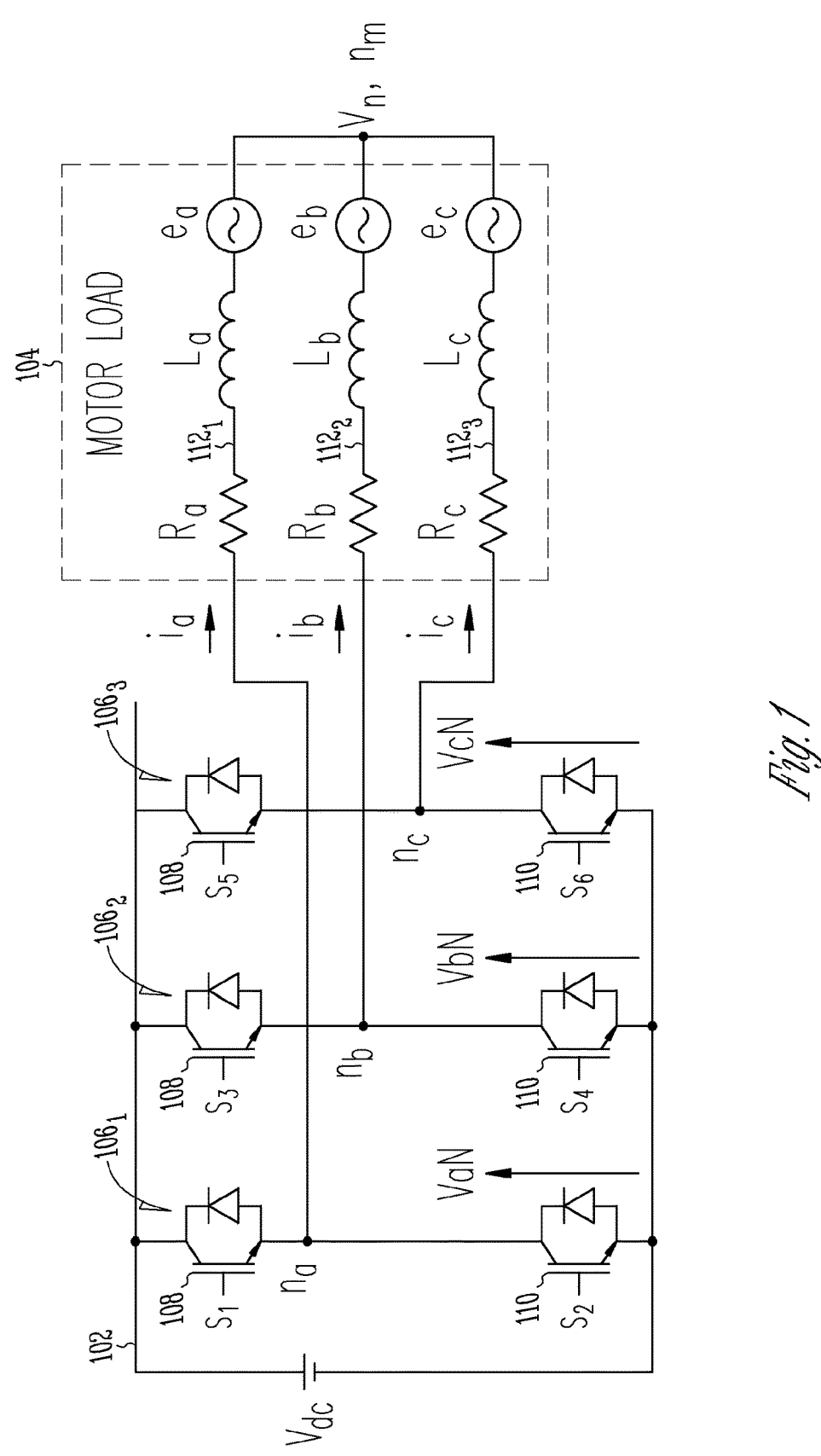
FIG. 1 is an illustrative schematic diagram of an example known exclusive-leg VSI circuit coupled between a DC voltage source and a motor.

FIG. 1 is an illustrative schematic diagram of an example known system 100 that includes an exclusive-leg VSI circuit 102 coupled between a DC voltage source $V_{dc}$ and a motor 104 to drive the motor 104. The VSI circuit 102 converts the DC voltage (also referred to as the "bus voltage"), to first, second, and third pulse width modulated AC leg voltages $v_a$, $v_b$, and $v_c$ and provides the leg voltages as excitation input signals to the motor 104. The VSI circuit 102 includes first, second, and third half-bridge "leg" circuits $106_1$, $106_2$, $106_3$, respectively, coupled between $V_{dc}$, and ground. A midpoint of each half-bridge is electrically coupled to a phase of the motor. For brevity of description the half bridge legs shall be referred to as "legs" herein. The first, second, and third legs $106_1$, $106_2$, $106_3$ of the VSI circuit 102 are "exclusive legs". The term "exclusive leg" as used herein signifies a half-bridge leg that is electrically coupled to only one phase of only one motor. The term "exclusive excitation signal" shall be used herein to refer to an excitation signal provided to a phase that is electrically coupled to an exclusive leg.

In an example VSI circuit 102, each leg includes first and second power electronic switches, 108, 110, respectively. A first switch 108 in each leg is coupled as a voltage pull-up switch and a second switch 110 in each leg is coupled as a voltage pull-down switch. In an example VSI circuit 102, the power switches 108, 110 of the legs $106_1$, $106_2$, $106_3$ include metal-oxide semiconductor field effect transistors (MOS-FETs). In alternative example VSIs, the power switches 108, 110 can be insulated gate bipolar transistors (IGBTs). MOS-FETs are usually used for high frequency applications with lower voltage requirements, while IGBTs tend to be used for lower frequency, higher power applications. In another example VSI circuit (not shown), the power switches can be gallium-nitride (GaN) FETs. In yet another example VSI circuit (not shown), the power switches can be silicon-carbide (SiC) FETs.

An example motor 104 includes first, second, and third phases $112_1$, $112_2$, $112_3$, respectively. Each phase includes one or more windings. A first phase $112_1$ includes a first winding resistance $R_a$, a first winding inductance $L_a$, and a first back-EMF $e_a$ coupled in series between a first leg voltage $v_1$ at a first center tap node $n_a$ of the first leg $106_1$ and a neutral voltage $v_N$ at node $n_M$ of the motor. It will be understood that the back-emf represents the entire voltage across the motor's circuit elements (R,L,BEMF). The neutral voltage is the average of the phase voltages, in this case $v_1$, $v_2$, and $v_3$. A first excitation current $i_a$ is provided to the first phase $112_1$. A second phase $112_2$ includes a second winding resistance $R_b$, a second winding inductance $L_b$, and a second back-EMF $e_b$ coupled in series between second leg voltage $v_2$ at a second center tap node $n_b$ of the leg $106_2$ and the neutral voltage $v_N$ at node $n_M$ of the motor. A second excitation current $i_b$ is provided to the second phase $112_2$. A third phase $112_3$ includes a third winding resistance $R_c$, a third winding inductance $L_c$, and a third back-EMF $e_c$ coupled in series between third leg voltages $v_3$ at a third center tap node $n_c$ of the third $106_3$ and the voltage $v_N$ node at $n_M$ of the motor. A third excitation current $i_C$ is provided to the third phase $112_2$.

Figure 2:
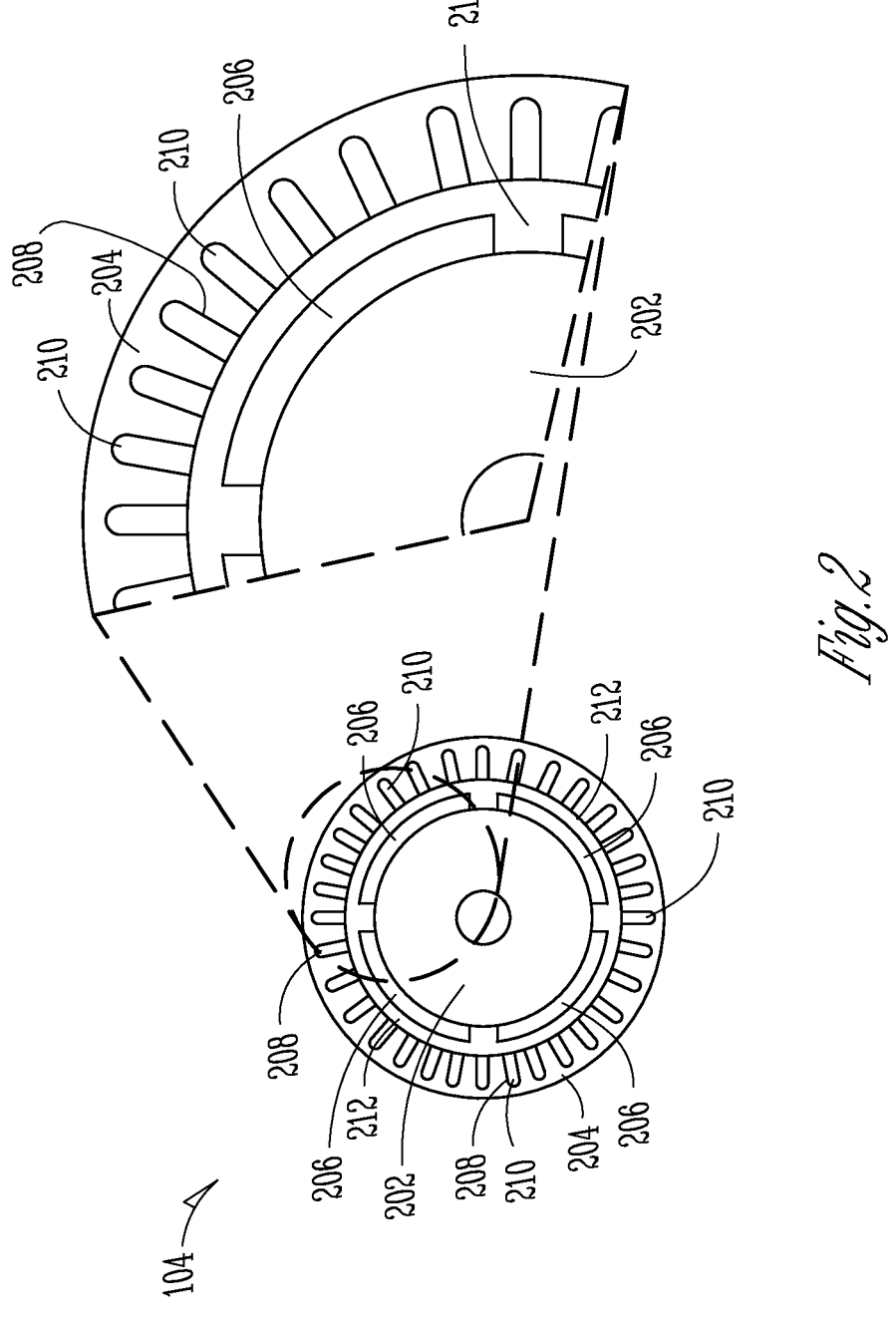
FIG. 2 is an illustrative transverse cross-section view of the example motor of FIG. 1.

FIG. 2 is an illustrative transverse cross-section view of the example motor 104 of FIG. 1. The example motor 104 is a permanent magnet synchronous motor (PMSM). The motor 104 includes a rotor 202 that rotates within a generally cylindrical stator 204. Permanent magnets 206 mounted on the rotor 202 rotate in unison with the rotor 202. The stator 204 defines slots 208 in which wire windings 210 are located. Each phase $112_1$, $112_2$, $112_3$ can include one or more of these winding. Multiple windings can be coupled to act as a single phase. An air gap 212 separates an outer periphery of the rotor 202 and its magnets 206 from the windings 210. An air gap flux is the sum of stator and rotor flux linages. In a PMSM, rotor flux linkages are generated by the permanent magnets and the stator flux linkages are generated by stator current. It will be understood that an alternative electric motor configuration such as a brushless DC (BLDC) motor may be used to implement the motor 104. Alternative example motors include rotor and stator having different geometries. For example, in an alternative example motor, the rotor is located outside the stator ("out-runner motor"). In another alternative example motor, both the rotor and the stator both are disks ("axial flux"). Commutation operates the same in all cases.

Figure 3:
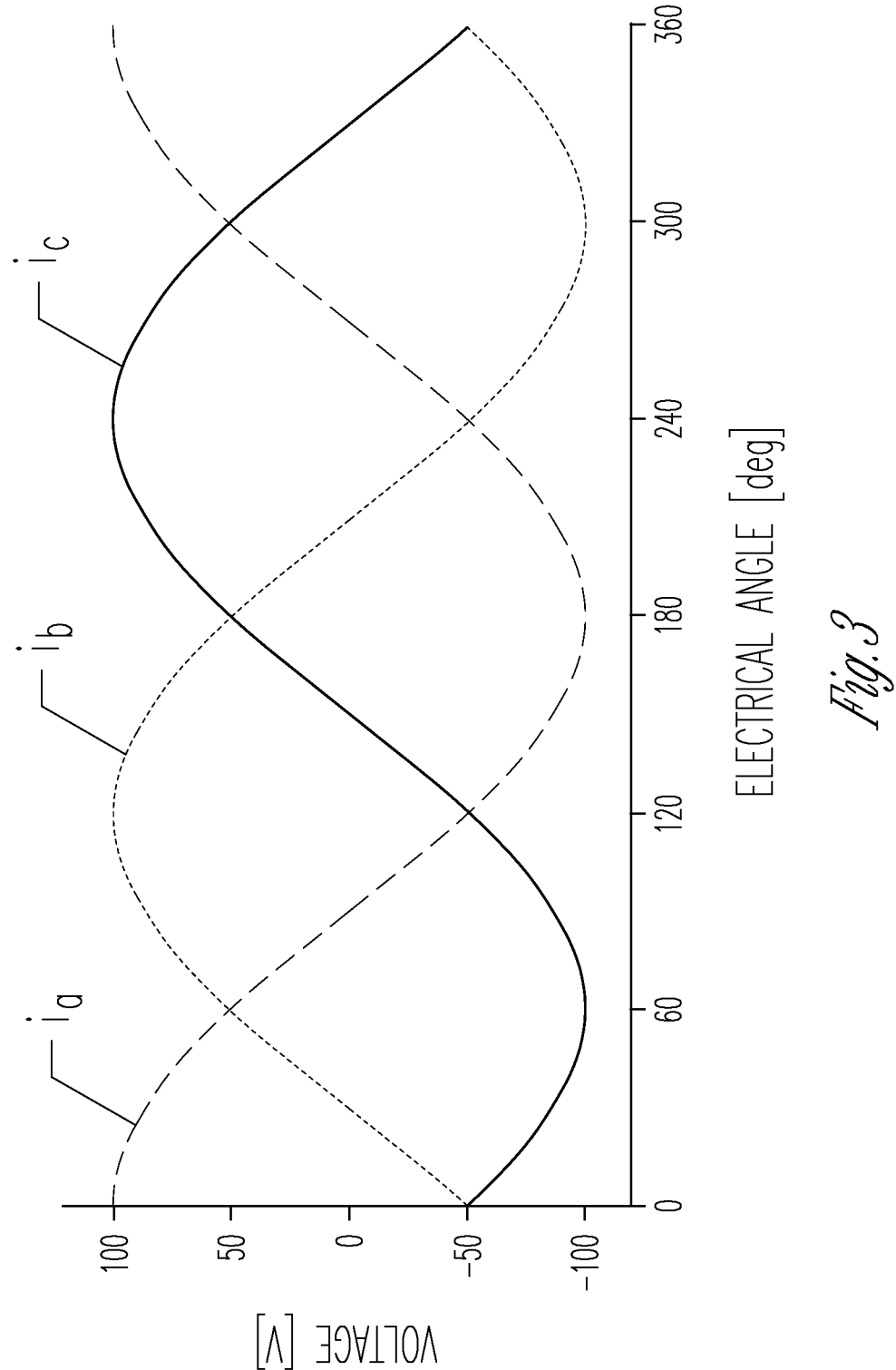
FIG. 3 is an illustrative timing diagram showing an example ideal balanced set of sinusoidal excitation signals imparted to the three-phases of FIG. 1.

FIG. 3 is an illustrative timing diagram 300 showing an example ideal balanced set of sinusoidal excitation signals imparted to the three-phases of FIG. 1. The illustrative timing diagram 300 shows voltage as a function of phase angle. A first example excitation signal $v_1$ is imparted by the first leg $106_1$ at the first center tap node $n_a$. A second example excitation signal $v_2$ is imparted by the second leg $106_2$ at the second center tap node $n_b$. A third example excitation signal $v_3$ is imparted by the third leg $106_3$ at the third center tap node $n_c$. The example balanced sinusoidal voltages are imparted to the motor phases to create torque within the motor. It will be appreciated that in practice, that a VSI circuit 106 can be controlled to produce PWM modulated signals that can only approximate the ideal waveforms shown in FIG. 3. Moreover, it will be understood that alternative example excitation waveforms can be provided. For example, the waveforms can be trapezoidal or can have some higher harmonic content depending upon the back-EMF waveform of the motor.

Figure 4:
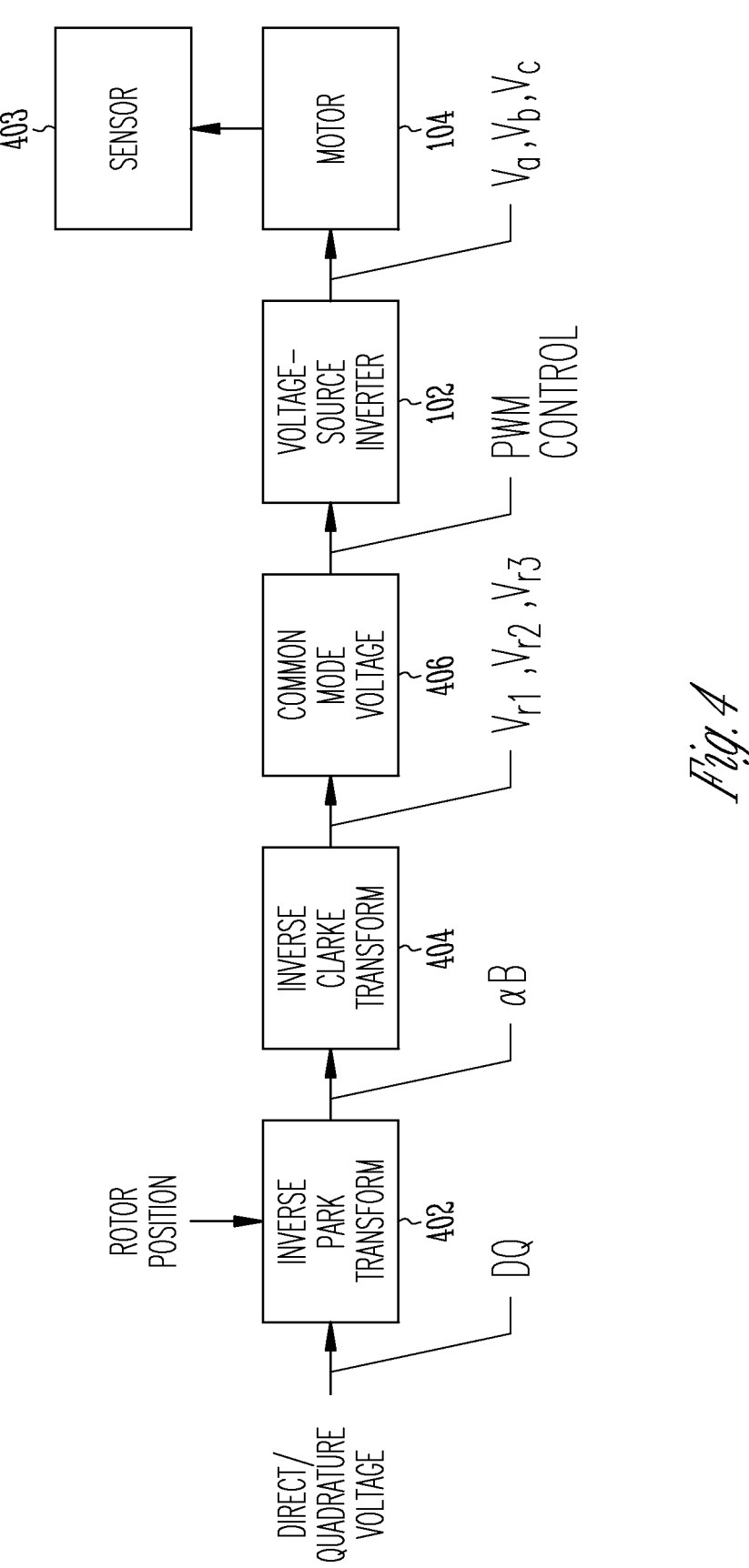
FIG. 4 is an illustrative drawing showing an example known commutation control system to use the exclusive leg VSI of FIG. 1 to commutate phase voltages of the motor to produce motor torque.

FIG. 4 is an illustrative drawing showing an example known commutation control system 400 to use the exclusive leg VSI 102 of FIG. 1 to commutate phase voltages of the motor 104 to produce motor torque. Processor circuits 1002 of the computer system 1000 of FIG. 10 can be specially configured according to the instructions 1024 to implement the commutation control system 400. Any one or more of the blocks described herein can be implemented using hardware alone or a combination of hardware and software. For example, any block described herein may physically include an arrangement of one or more of the processor circuits to perform operations described herein for that block. Accordingly, different blocks described herein may include and configure different arrangements of the processor circuitry at different points in time or a single arrangement of the processor circuitry at different points in time.

Block 402 performs the well-known Inverse Park transformation to transform quantities from a two-axis rotating coordinate system attached to the rotor to space vector voltages (sometimes referred to as "alpha-beta voltages") in a two-axis stationary coordinate system attached to the stator. A sensing element 403 senses the rotor's instantaneous angular position. Block 402 receives the rotor's current angular position ($\theta$) and a desired D-Q signal voltage vector signal having direct axis component (D) and a quadrature axis component (Q), which are aligned with the rotor such that the direct axis component (D) points along one of the rotor's north poles and the quadrature axis component (Q) points 90 degrees away from the direct component axis. In this case, torque produced by the motor is directly proportional to current in the quadrature axis component (Q). The Inverse Park transform operation translates the direct and quadrature component voltage values in the rotating two-axis D-Q coordinate system based upon the current angular position ($\theta$) of the rotor, to space vector voltages in a stationary two-axis space vector coordinate system $\alpha$, $\beta$ of the motor's stationary stator in which an alpha ($\alpha$) or first component aligns with a selected phase in the motor circuit 104.

Block 404 performs the well-known Inverse Clarke transformation to transform the stationary space vector $\alpha$, $\beta$ signal values to phase signal values $v_{r1}$, $v_{r2}$, $v_{r3}$. The well-known Inverse Clarke Transform can transform quantities from a stationary two-axis coordinate system to a stationary three-axis coordinate system, referenced to the stator. In particular, block 404 receives the stationary space vector voltages $\alpha$, $\beta$ in a stationary two-axis space vector coordinate system and transforms them to a stationary three-axis phase voltage signals $v_{r1}$, $v_{r2}$, $v_{r3}$ attached to the stator. The Inverse Clarke transformation is a fixed linear mapping that does not require knowledge of the rotor position, only the electrical spacing of the phases. In an N-phase motor, the phases are always spaced 360/N degrees apart, so that they are 120° apart in a three-phase motor. The amplitude-invariant, three-phase Clarke transform is given by the formulation, $$K_e = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}$$

and its inverse is given by its right-hand, Moore-Penrose pseudoinverse formulation, $$K_e^\dagger = \begin{bmatrix} 1 & 0 \\ -\frac{1}{2} & \frac{\sqrt{3}}{2} \\ -\frac{1}{2} & -\frac{\sqrt{3}}{2} \end{bmatrix}$$

so that, $$K_c K_e^\dagger = \begin{bmatrix} 1 & 0 \\ 0 & 1 \end{bmatrix}$$

During the Inverse Clarke Transformation operation 404, the two elements of the space vector voltage are multiplied by $$K_c^\dagger$$

to produce the phase voltages.

Block 406 modulates the phase voltages based upon a duty cycle and adds a common mode voltage to the scaled voltage and produce PWM input control signals to the VSI circuit 102. Adding the common mode voltage ensures that positive pulse width modulation control signals are provided to control terminals $s_1$-$s_6$ of the VSI legs 106$_1$, 106$_2$, 106$_3$. It will be appreciated that the phase voltages produced by operation 404 will include negative values, which cannot be generated by the VSI, as the VSI can generate only voltages between ground and the bus voltage, $V_{dc}$. The addition of the common mode voltage to the phase voltages increases all phase voltages so that no phase voltage is negative.

The VSI circuit 102 generates pulse width modulated (PWM) excitation signals based upon the pulse width modulation input control values produced during operation 406, which approximate the excitation voltages of FIG. 2. The first, second, and third excitation voltage signals $v_a$, $v_b$, and $v_c$ are provided to the phases 112$_1$, 112$_2$, 112$_3$ of the motor 104 to impart motor torque. Corresponding first, second, and third excitation current signals $i_a$, $i_b$, $i_c$ also are provided to the phases of the motor 104.

Figure 5:
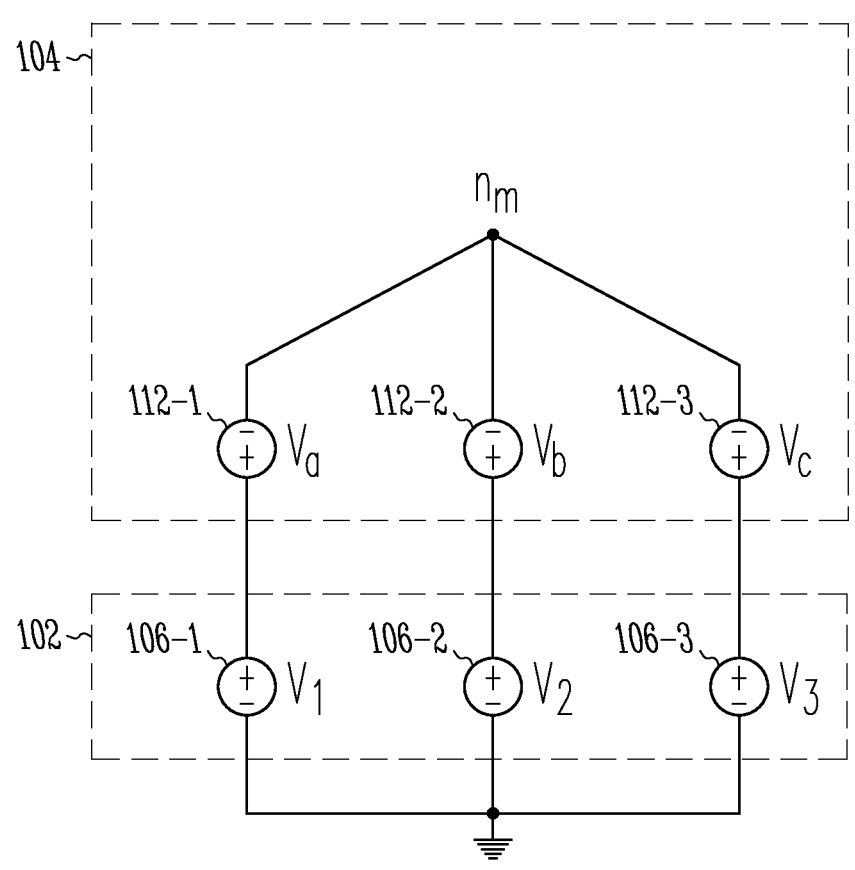
FIG. 5 is an illustrative representation of the example known exclusive-leg VSI and the motor phases of FIG. 1, represented as ideal voltage sources.

FIG. 5 is an illustrative representation of the example known system 100 of FIG. 1 with VSI legs and motor phase represented as ideal voltage sources. Voltage $v_1$ represents the excitation voltage provided at the first center tap node $n_a$ at the first leg 106$_1$ of the VSI 102. Voltage $v_2$ represents the excitation voltage provided at the second center tap node $n_b$ at the second leg 106$_2$ of the VSI 102. Voltage $v_3$ represents the excitation voltage provided at the third center tap node $n_b$ at the third leg 106$_3$ of the VSI 102. Voltage $v_a$ represents a voltage of the first phase 112$_1$. Voltage $v_b$ represents a voltage of the second phase 112$_2$. Voltage $v_c$ represents a voltage of the third phase 112$_3$. Via Kirchhoff's voltage law:

$$0 = -v_1 + v_a - v_b + v_2$$

$$0 = -v_2 + v_b - v_c + v_3$$

If we group the voltage vectors as, $$v_{abc} = \begin{bmatrix} v_a \\ v_b \\ v_c \end{bmatrix}$$

$$v_{123} = \begin{bmatrix} v_1 \\ v_2 \\ v_3 \end{bmatrix}$$

$$X = \begin{bmatrix} 1 & -1 & 0 \\ 0 & 1 & -1 \end{bmatrix}$$

then we have, $$X v_{123} = X v_{abc}$$

The inventor set a goal to explicitly state a dependence of $v_{abc}$ on $v_{123}$. The above system has two equations with three unknowns, so the solution will have a one-dimensional null space. The solution can be found via, $$v_{abc} = X^\dagger X v_{123} = P v_{123}$$

where † is the psuedoinverse, and P has the solution $$P = \frac{1}{3}\begin{bmatrix} 2 & -1 & -1 \\ -1 & 2 & -1 \\ -1 & -1 & 2 \end{bmatrix}$$

This is a rank-2 orthogonal projection, and the null space is the common mode. The inventor realized any scalar voltage $v_z$ can be added to the elements of $v_{123}$ and it will have no impact on $v_{abc}$.

$$v_{abc} = Pv_{123} = P(v_{123} + 1_{3\times1}v_z)$$

This observation indicates that dependence of $v_{abc}$ on $v_{123}$ can be represented in a manner such that an arbitrary value can be used for a common mode.

The scalar $v_z$ is often referred to the "zero sequence" in the literature and determines the voltage at the node n in the example motor of FIG. 1. The voltage $v_z$ permits the generation of negative voltages across $v_{abc}$ with nonnegative elements of $v_{123}$. It always is possible to add a scalar to $v_{123}$ that results in the nonnegative voltages in the legs of the VSI. For example, $v_z$ often is selected to be half of $V_{dc}$. The value of $v_z$ is selectable and often is selected to minimize switching loss or to maximize FET linearity.

Figure 6:
FIG. 6 is an illustrative representation of two exclusive-leg VSI circuits driving two motors of the kind shown in FIG. 5, represented as ideal voltages.

FIG. 6 is an illustrative representation of a system 600 that includes two exclusive-leg VSI circuits $VSI_1$, $VSI_2$ driving two motors $M_1$, $M_2$, respectively, of the kind shown in FIG. 5, represented as ideal voltages. A first motor $M_1$ and a first VSI circuit $VSI_1$ and a second motor $M_2$ and a second VSI circuit $VSI_2$ of FIG. 6 have the same topology as the VSI circuit and the motor of FIG. 5, and therefore, will be understood from the above disclosure and will not be explained again. FIG. 5 and FIG. 6 show clear examples of exclusive VSI legs, since there is a one-to-one correspondence between VSI legs and motor phases.

Still referring to FIG. 6,

Letting $$v_n = \begin{bmatrix} v_{a1} \\ v_{b1} \\ v_{c1} \\ v_{a2} \\ v_{b2} \\ v_{c2} \end{bmatrix}$$

$$v_N = \begin{bmatrix} v_1 \\ v_2 \\ v_3 \\ v_4 \\ v_5 \\ v_6 \end{bmatrix}$$

we have from a similar application of KVL, $$\begin{bmatrix} X & 0 \\ 0 & X \end{bmatrix} v_n = \begin{bmatrix} X & 0 \\ 0 & X \end{bmatrix} v_N$$

or, more compactly, $$(I_2 \otimes X)v_n = (I_2 \otimes X)v_N$$

where $\otimes$ is the Kronecker product. This results in a projection, $$P_2 = (I_2 \otimes X)^\dagger(I_2 \otimes X) = (I_2 \otimes X^\dagger)(I_2 \otimes X) = (I_2 \otimes X^\dagger X) = (I_2 \otimes P)$$

which is a block-diagonal repetition of our previous value for P and will have a two-dimensional null space, one for each common mode of the phase voltages, so that there are now two zero-sequence voltages:

$$v_n = (I_2 \otimes P)\left(v_N + (I_2 \otimes 1_{3\times1})\begin{bmatrix} v_{z1} \\ v_{z2} \end{bmatrix}\right)$$

B. Reduced-Leg VSI and Corresponding Electric Motor and Commutation

Referring to the above algebraic framework, the inventor had the insight that a two-dimensional null space is not necessary if its primary purpose is to make the voltages $v_n$ realizable by the VSI. Instead, the inventor surmised that a one-dimensional null space could suffice. The inventor further surmised that there is a mapping solution in which N voltage sources (e.g., VSI legs) are mapped to n motors so that N<3n in which case we would have, $$v_n = P_N(v_N + 1_{N\times1}v_z)$$

and $v_z$ could be chosen to make all generated voltages nonnegative while achieving the desired $v_n$. As explained more fully below, the inventor determined that this result was indeed possible.

Figure 7:
FIG. 7 is an illustrative representation of a system that includes two motors and a VSI circuit that includes a shared-leg, represented as ideal voltages.

FIG. 7 is an illustrative representation of a system 700 that includes two motors $M_1$, $M_2$ and a VSI circuit 702 that includes a shared-leg, represented as ideal voltages. A shared-leg represented by ideal voltage $v_3$ is coupled to drive a third phase represented by ideal voltage $v_{c1}$ of a first motor $M_1$ and to drive a first phase represented by ideal voltage $v_{a2}$ of a second motor $M_2$. The term "shared leg" as used herein refers to a leg that is electrically coupled to provide an excitation signal to one phase in each of two different motors. Conversely, an excitation signal provided by a shared leg to two different phases that are electrically coupled to the shared leg is referred to herein as a "shared excitation signal".

Still referring to FIG. 7, phase $v_{a1}$ of motor $M_1$ is coupled between exclusive leg $v_1$ and the motor $M_1$ at neutral voltage node $n_1$. Phase $v_{b1}$ of motor $M_1$ is coupled between exclusive leg $v_2$ and the motor $M_1$ at neutral voltage node $n_1$. Phase $v_{b2}$ of motor $M_2$ is coupled between exclusive leg $v_4$ and the motor $M_2$ at neutral voltage node $n_2$. Phase $v_{c2}$ of motor $M_2$ is coupled between exclusive leg $v_5$ and the motor $M_2$ at neutral voltage node $n_2$. Phase $v_{c1}$ of motor $M_1$ is coupled between the motor $M_1$ at neutral node $n_1$ and shared leg $v_3$. Phase $v_{a2}$ of motor $M_2$ is coupled between the motor $M_2$ neutral node $n_2$ and shared leg $v_3$. Thus, phases $v_{a1}$, $v_{b1}$, $v_{b2}$, and $v_{c2}$ are coupled to receive exclusive excitation signals, and phases $v_{c1}$ and $v_{a2}$ are coupled to receive shared excitation signals.

The system 700 includes a total of N=5 VSI legs.

The relationship between VSI leg voltages and phase voltages is given by, $$0 = -v_1 + v_{a1} - v_{b1} + v_2$$

$$0 = -v_2 + v_{b1} - v_{c1} + v_3$$

$$0 = -v_3 + v_{a2} - v_{b2} + v_4$$

$$0 = -v_4 + v_{b2} - v_{c2} + v_5$$

which may be expressed as $$Y_N v_N = (I_2 \otimes X) v_n$$

where $$Y_N = \begin{bmatrix} 1 & -1 & & \ldots & 0 \\ & 1 & -1 & & \vdots \\ \vdots & & \ddots & \ddots & \\ 0 & \ldots & & 1 & -1 \end{bmatrix}_{N-1 \times N}$$

It is noted that the block diagonal structure is now lost on the $v_N$ side but retained on the $v_n$ side. The projection method developed above still applies for finding the dependence of $v_n$ on $v_N$. We then have $$v_n = (I_2 \otimes X^\dagger) Y_N v_N$$

This is essentially our original $P_2$ but block-permuted so that it has been squeezed in by a column. This matrix will have a 1-dimensional null space—again the common mode—which we can use to ensure the voltages needed from the VSI stay positive:

$$v_n = (I_2 \otimes X^\dagger) Y_N (v_N + 1_{N \times 1} v_z) = (I_2 \otimes X^\dagger) Y_N v_N$$

The inventor realized that the above strategy to determine dependence of $v_n$ on $v_N$ with a one-dimensional null space generalizes to n motors, so long as they are arranged in a ladder configuration.

Figure 8:
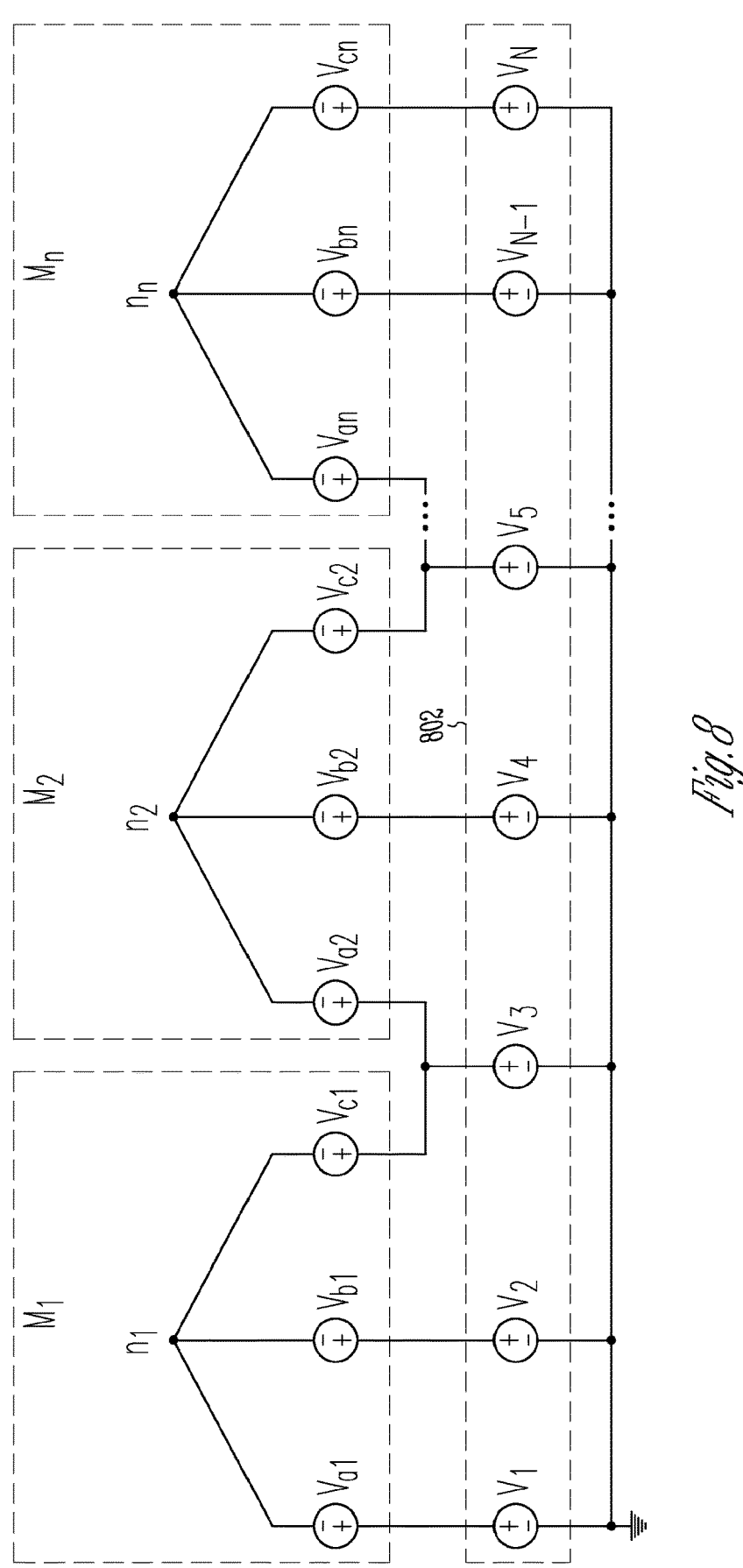
FIG. 8 is an illustrative representation of a system that includes multiple motors and a VSI circuit that includes multiple shared legs and multiple exclusive legs, coupled in in a ladder topology and represented as ideal voltage sources.

FIG. 8 is an illustrative representation of a system 800 that includes multiple motors and a VSI circuit 802 that includes multiple shared legs and multiple exclusive legs, coupled in in a ladder topology and represented as ideal voltage sources. The VSI legs and motors of the system are represented as ideal voltage sources. The example system 800 includes N VSI legs coupled to drive n motors, where N=2n+1. Thus, N<3n, which means that the number of VSI legs required to drive the motors is reduced. A shared-leg represented by ideal voltage $v_3$ is coupled to impart a first shared excitation signal to the third phase represented by ideal voltage $v_{c1}$ of a first motor and to impart the first shared excitation signal to a first phase represented by ideal voltage $v_{a2}$ of a second motor. A shared-leg represented by ideal voltage $v_5$ is coupled to impart a second shared excitation signal to the third phase represented by ideal voltage $v_{c2}$ of a second motor and to impart the second shared excitation signal to a first phase represented by ideal voltage $v_{a3}$ (not shown) of a third motor (not shown). A shared-leg represented by ideal voltage $v_{N-2}$ (not shown) is coupled to impart a shared excitation signal to the third phase represented by ideal voltage $v_{cn-1}$ of an n−1th motor (not shown) and to impart the same shared excitation signal to a first phase represented by ideal voltage $v_{an}$ of an $n_{th}$ motor. An exclusive leg $v_{N-1}$ is coupled to impart an exclusive excitation signal to phase $v_{bn}$ of motor $M_n$. An exclusive leg $v_N$ is coupled to impart a different exclusive excitation signal to phase $v_{cn}$ of motor $M_n$.

Given the voltage vectors $$v_n = \begin{bmatrix} v_{a1} \\ v_{b1} \\ v_{c1} \\ \vdots \\ v_{an} \\ v_{bn} \\ v_{cn} \end{bmatrix}$$

$$v_N = \begin{bmatrix} v_1 \\ \vdots \\ v_N \end{bmatrix}$$

The voltage of the motor phases are related to the voltage of the VSI legs via $$v_n = Z_n v_N$$

where $$Z_n = (I_n \otimes X^\dagger) Y_{2n+1}$$

which will have a null space basis of $1_{2n+1 \times 1}$ (i.e. the common mode does not affect the motor phases). The matrix $Z_n$ itself turns out to have a very basic structure:

$$Z_n = \frac{1}{3} \begin{bmatrix} 2 & -1 & -1 & & & & & \ldots & 0 \\ -1 & 2 & -1 & & & & & & \vdots \\ -1 & -1 & 2 & & & & & & \\ & & & 2 & -1 & -1 & & & \\ & & & -1 & 2 & -1 & & & \\ & & & -1 & -1 & 2 & & & \\ & & & & & & \ddots & \ddots & \ddots \\ & & & & & & 2 & -1 & -1 \\ \vdots & & & & & & -1 & 2 & -1 \\ 0 & \ldots & & & & & -1 & -1 & 2 \end{bmatrix} \in \mathbb{R}^{3n \times 2n+1}$$

It is noted that this ladder topology of connecting phases is significantly different than the one proposed by Dujic et. al., in which all motors share a single common phase. The shared-common-phase results in a mapping that is different than $Z_n$, and which also has a significantly higher 2-norm, suggesting it is more sensitive to errors in $v_N$. Thus, the ladder topology will be more robust to commutation errors when compared to the single-shared-leg topology.

It will be appreciated that we cannot achieve an arbitrary $v_N$ as we can with the 3n-leg inverter. In fact, it is not clear how to use $Z_n$ to achieve a desired phase voltage, since rank($Z_N$)=2n, which is not full rank in either dimension. In this case, $Z_N$ does not have a valid left pseudoinverse, and we cannot solve for $v_N$. However, many of the voltages achievable result in no meaningful torque on the motor. For traditional VSIs, this is solved by employing the Clarke transform, which reduces 3D phase voltages to 2D $\alpha\beta$ (space vector) frame.

$$K_c = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}$$

and reducing the dimension of the voltages and currents to the space-vector dimensions $\alpha$ and $\beta$:

$$v_{\alpha\beta} = K_c v_{abc}$$

If we define 2n-dimensional $\alpha\beta$ space as $$v_{\alpha\beta n} = \begin{bmatrix} v_{\alpha 1} \\ v_{\beta 1} \\ \vdots \\ v_{\alpha n} \\ v_{\beta n} \end{bmatrix} = \begin{bmatrix} K_c\begin{bmatrix} v_{a1} \\ v_{b1} \\ v_{c1} \end{bmatrix} \\ \vdots \\ K_c\begin{bmatrix} v_{an} \\ v_{bn} \\ v_{cn} \end{bmatrix} \end{bmatrix} = (I_n \otimes K_c)v_n$$

then $$v_{\alpha\beta n} = S_n v_N$$

where $$S_n = (I_n \otimes K_c)(I_n \otimes X^\dagger)Y_{2n+1} =$$

$$\frac{2}{3}\begin{bmatrix} 1 & -\frac{1}{2} & -\frac{1}{2} & & & & 0 \\ 0 & \frac{\sqrt{3}}{2} & -\frac{\sqrt{3}}{2} & & & & \vdots \\ & & 1 & & -\frac{1}{2} & -\frac{1}{2} & \\ & & 0 & & \frac{\sqrt{3}}{2} & -\frac{\sqrt{3}}{2} & \\ & & & \ddots & & \ddots & \ddots \end{bmatrix} \in \mathbb{R}^{2n \times 2n+1}$$

To be clear, $K_c$-bar and Sn are the same thing. They are labeled in this manner herein to help persons familiar with field-oriented motor control understand what actually happens.

The new transform $S_n$ is the Clarke transform repeated in a kind of "squished" block diagonal structure. The new transform $S_n$ has full row rank and thus a left inverse that may be found from a pseudoinverse. The pseudoinverse can be computed offline.

Given n $\alpha\beta$ motor voltages, we can determine leg voltages from $$v_N = S_n^\dagger v_{\alpha\beta n} + 1_{2n+1}v_z$$

where $v_z$ is a free common-mode voltage used to keep $v_N$ within constraints of VSI legs.

C. Commutation Control System

Figure 9:
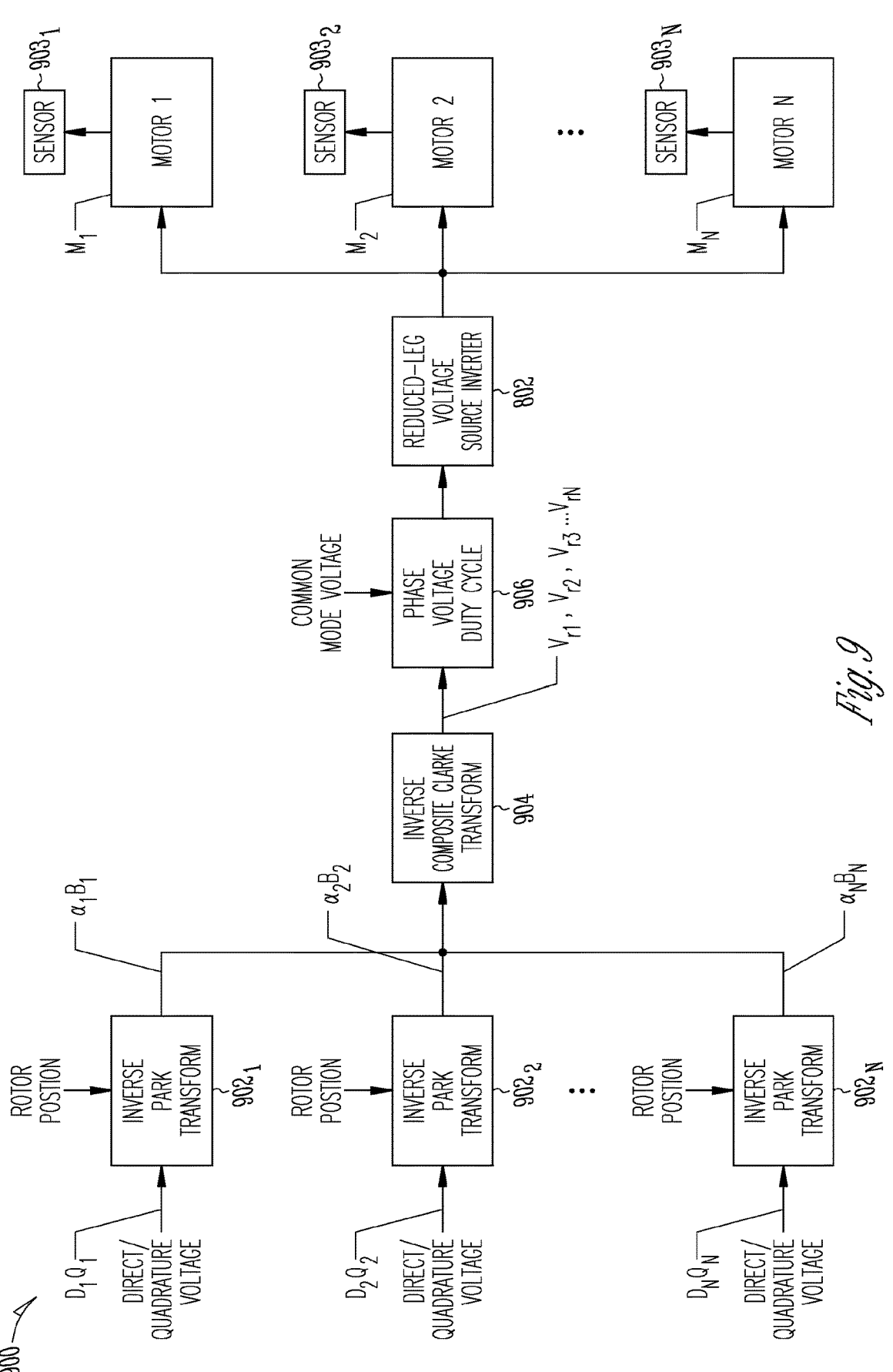
FIG. 9 is an illustrative drawing showing example commutation control circuitry to use a shared leg VSI coupled in a ladder topology that drives n motors to commutate phase voltages to produce motor torque in each of the motors.

FIG. 9 is an illustrative drawing showing example commutation control system 900 to use a VSI circuit that includes a combination of shared legs and exclusive legs coupled in a ladder topology to drive multiple motors to produce motor torque. Processor circuits 1002 of the computer system 1000 of FIG. 10 can be specially configured according to the instructions 1024 to implement the commutation control system 900. Any one or more of the blocks described herein can be implemented using hardware alone or a combination of hardware and software. For example, any block described herein may physically include an arrangement of one or more of the processor circuits to perform operations described herein for that block. Accordingly, different blocks described herein may include and configure different arrangements of the processor circuitry at different points in time or a single arrangement of the processor circuitry at different points in time.

Blocks $902_1$-$902_n$ perform respective Inverse Park transforms for respective ones of the n motors $104_1$-$104_n$ to translate respective direct (D) and respective quadrature (Q) component voltage signals in the respective motors' rotating two-axis D-Q coordinate systems based upon respective angular rotor positions, to respective space vector voltage signals $\alpha$, $\beta$ in respective stationary two-axis space vector coordinate systems in the respective motors' stationary stators. Sensing elements $903_1$-$903_n$ sense the respective rotor's instantaneous angular positions.

Block 904 performs an Inverse Composite Clarke transform function to transform the stationary space vector voltages $\alpha$, $\beta$ determined for all n motors to phase voltages $v_{r1}$, $v_{r2}$, $v_{r3}$, . . . $v_{rN}$ where N=2n+1, to be used to produce inputs to respective control terminals of VSI legs. The Inverse Composite Clarke transform function is derived based upon the topology of the coupling between VSI legs and motor phases. More particularly, an example Inverse Composite Clarke transform function can be derived by determining a mapping of shared phases into individual space vector frames as described above. For a ladder topology, the composite Clarke transform function ends up like a block-matrix $\overline{K}_c$ of the form $$\overline{K}_c^\dagger = \frac{2}{3}\begin{bmatrix} 1 & -\frac{1}{2} & -\frac{1}{2} & \cdots & 0 \\ 0 & \frac{\sqrt{3}}{2} & -\frac{\sqrt{3}}{2} & & \vdots \\ & & 1 & -\frac{1}{2} & -\frac{1}{2} \\ & & 0 & \frac{\sqrt{3}}{2} & -\frac{\sqrt{3}}{2} \\ & & & \ddots & \ddots & \ddots \end{bmatrix}$$

The right-hand, Moore-Penrose pseudoinverse of $\overline{K}_c$ does not have a convenient block structure but may be easily computed numerically offline (e.g., via Matlab's pinv command for example). For two motors, the Inverse Composite Clarke transform function is $$\overline{K}_c^\dagger = \begin{bmatrix} \frac{6}{5} & \frac{\sqrt{3}}{5} & \frac{3}{5} & 0 \\ -\frac{3}{10} & \frac{7\sqrt{3}}{10} & \frac{3}{5} & 0 \\ -\frac{3}{10} & -\frac{3\sqrt{3}}{10} & \frac{3}{5} & 0 \\ -\frac{3}{10} & -\frac{3\sqrt{3}}{10} & \frac{9}{10} & \frac{\sqrt{3}}{2} \\ -\frac{3}{10} & -\frac{3\sqrt{3}}{10} & -\frac{9}{10} & -\frac{\sqrt{3}}{2} \end{bmatrix}$$

While for three motors the Inverse Composite Clarke transform function is $$
\overline{K}_c^\dagger =
\begin{bmatrix}
\dfrac{9}{7} & \dfrac{2\sqrt{3}}{7} & \dfrac{6}{7} & \dfrac{\sqrt{3}}{7} & \dfrac{3}{7} & 0 \\[6pt]
-\dfrac{3}{14} & \dfrac{11\sqrt{3}}{14} & \dfrac{6}{7} & \dfrac{\sqrt{3}}{7} & \dfrac{3}{7} & 0 \\[6pt]
-\dfrac{3}{14} & -\dfrac{3\sqrt{3}}{14} & \dfrac{6}{7} & \dfrac{\sqrt{3}}{7} & \dfrac{3}{7} & 0 \\[6pt]
-\dfrac{3}{14} & -\dfrac{3\sqrt{3}}{14} & -\dfrac{9}{14} & \dfrac{9\sqrt{3}}{14} & \dfrac{3}{7} & 0 \\[6pt]
-\dfrac{3}{14} & -\dfrac{3\sqrt{3}}{14} & -\dfrac{9}{14} & -\dfrac{5\sqrt{3}}{14} & \dfrac{3}{7} & 0 \\[6pt]
-\dfrac{3}{14} & -\dfrac{3\sqrt{3}}{14} & -\dfrac{9}{14} & -\dfrac{5\sqrt{3}}{14} & -\dfrac{15}{14} & \dfrac{\sqrt{3}}{2} \\[6pt]
-\dfrac{3}{14} & -\dfrac{3\sqrt{3}}{14} & -\dfrac{9}{14} & -\dfrac{5\sqrt{3}}{14} & -\dfrac{15}{14} & -\dfrac{\sqrt{3}}{2}
\end{bmatrix}
$$

For five motors the Inverse Composite Clarke transform function is $$
\overline{K}_c^\dagger =
\begin{bmatrix}
\dfrac{15}{11} & \dfrac{4\sqrt{3}}{11} & \dfrac{12}{11} & \dfrac{3\sqrt{3}}{11} & \dfrac{9}{11} & \dfrac{2\sqrt{3}}{11} & \dfrac{6}{11} & \dfrac{\sqrt{3}}{11} & \dfrac{3}{11} & 0 \\[5pt]
-\dfrac{3}{22} & \dfrac{19\sqrt{3}}{22} & \dfrac{12}{11} & \dfrac{3\sqrt{3}}{11} & \dfrac{9}{11} & \dfrac{2\sqrt{3}}{11} & \dfrac{6}{11} & \dfrac{\sqrt{3}}{11} & \dfrac{3}{11} & 0 \\[5pt]
-\dfrac{3}{22} & -\dfrac{3\sqrt{3}}{22} & \dfrac{12}{11} & \dfrac{3\sqrt{3}}{11} & \dfrac{9}{11} & \dfrac{2\sqrt{3}}{11} & \dfrac{6}{11} & \dfrac{\sqrt{3}}{11} & \dfrac{3}{11} & 0 \\[5pt]
-\dfrac{3}{22} & -\dfrac{3\sqrt{3}}{22} & -\dfrac{9}{22} & \dfrac{17\sqrt{3}}{22} & \dfrac{9}{11} & \dfrac{2\sqrt{3}}{11} & \dfrac{6}{11} & \dfrac{\sqrt{3}}{11} & \dfrac{3}{11} & 0 \\[5pt]
-\dfrac{3}{22} & -\dfrac{3\sqrt{3}}{22} & -\dfrac{9}{22} & -\dfrac{5\sqrt{3}}{22} & \dfrac{9}{11} & \dfrac{2\sqrt{3}}{11} & \dfrac{6}{11} & \dfrac{\sqrt{3}}{11} & \dfrac{3}{11} & 0 \\[5pt]
-\dfrac{3}{22} & -\dfrac{3\sqrt{3}}{22} & -\dfrac{9}{22} & -\dfrac{5\sqrt{3}}{22} & -\dfrac{15}{22} & \dfrac{15\sqrt{3}}{22} & \dfrac{6}{11} & \dfrac{\sqrt{3}}{11} & \dfrac{3}{11} & 0 \\[5pt]
-\dfrac{3}{22} & -\dfrac{3\sqrt{3}}{22} & -\dfrac{9}{22} & -\dfrac{5\sqrt{3}}{22} & -\dfrac{15}{22} & -\dfrac{7\sqrt{3}}{22} & \dfrac{6}{11} & \dfrac{\sqrt{3}}{11} & \dfrac{3}{11} & 0 \\[5pt]
-\dfrac{3}{22} & -\dfrac{3\sqrt{3}}{22} & -\dfrac{9}{22} & -\dfrac{5\sqrt{3}}{22} & -\dfrac{15}{22} & -\dfrac{7\sqrt{3}}{22} & -\dfrac{21}{22} & \dfrac{9\sqrt{3}}{22} & \dfrac{3}{11} & 0 \\[5pt]
-\dfrac{3}{22} & -\dfrac{3\sqrt{3}}{22} & -\dfrac{9}{22} & -\dfrac{5\sqrt{3}}{22} & -\dfrac{15}{22} & -\dfrac{7\sqrt{3}}{22} & -\dfrac{21}{22} & -\dfrac{9\sqrt{3}}{22} & \dfrac{3}{11} & 0 \\[5pt]
-\dfrac{3}{22} & -\dfrac{3\sqrt{3}}{22} & -\dfrac{9}{22} & -\dfrac{5\sqrt{3}}{22} & -\dfrac{15}{22} & -\dfrac{7\sqrt{3}}{22} & -\dfrac{21}{22} & -\dfrac{9\sqrt{3}}{22} & -\dfrac{27}{22} & \dfrac{\sqrt{3}}{2} \\[5pt]
-\dfrac{3}{22} & -\dfrac{3\sqrt{3}}{22} & -\dfrac{9}{22} & -\dfrac{5\sqrt{3}}{22} & -\dfrac{15}{22} & -\dfrac{7\sqrt{3}}{22} & -\dfrac{21}{22} & -\dfrac{9\sqrt{3}}{22} & -\dfrac{27}{22} & -\dfrac{\sqrt{3}}{2}
\end{bmatrix}
$$

In operation, mapping is achieved by multiplying the 2×n space-vector voltage signals α, β by the Inverse Composite Clarke transform function to determine phase voltage signals $v_{r1}$, $v_{r2}$, $v_{r3}$, ... $v_{rN}$. More particularly, the composite Clarke transform function configures the commutation control circuitry to map space vector voltage signals to a combination of phase voltage signals that includes shared phase voltage signals and exclusive phase voltage signals.

Block 906 modulates the phase voltage values based upon a duty cycle associated with a pulse width modulation format and adds a common mode voltage value to the phase voltages to produce pulse width modulation input control values for input to the VSI legs. Adding the common mode voltage ensures that positive pulse width modulation control signals are provided to control terminals of the VSI circuit 802. It is noted that a single common mode voltage is applied for all of the n motors. Similar to the explanation above with reference to FIG. 4, the phase voltages produced by operation 904 will include negative values, which cannot be generated by the VSI circuit 802, which can generate only voltages between ground and a bus voltage, $V_{dc}$. The addition of the common mode voltage to the phase voltages increases all phase voltages so that no phase voltage is negative.

The VSI circuit 802 generates pulse width modulated (PWM) excitation signals in response to the pulse width modulation input control values produced by block 906 to generate excitation voltages in each of the n motors that approximate the excitation voltages of FIG. 2, to produce motor torque in motors 104₁-104ₙ.

Example 1

A non-limiting example known dynamic model of a PMSM is as follows.

Usually model PMSM in dq frame, where d axis aligns with north pole of rotor.

$$
\begin{bmatrix} i_d \\ i_q \end{bmatrix} = K_p(\theta_c) \begin{bmatrix} i_\alpha \\ i_\beta \end{bmatrix} \qquad
\begin{bmatrix} v_d \\ v_q \end{bmatrix} = K_p(\theta_c) \begin{bmatrix} v_\alpha \\ v_\beta \end{bmatrix}
$$

where $K_p$ is Park transform $$
K_p(\theta_c) = \begin{bmatrix} \cos(\theta_c) & \sin(\theta_c) \\ -\sin(\theta_c) & \cos(\theta_c) \end{bmatrix}
$$

dq frame dynamics are $$
v_{dq} = \begin{bmatrix} R & -\omega_o L \\ \omega_c L & R \end{bmatrix} i_{dq} + L\frac{di_{dq}}{dt} + \omega_c \frac{k_c}{N_P}\begin{bmatrix} 0 \\ 1 \end{bmatrix}
$$

Performance is relevant in joint-space speed and torque. Joint space parameters are gear ratio $G_R$, torque constant $k_t$, pole pairs $N_P$. Substitute to find $v_{dq}$ as a function of joint speed w, joint torque $\tau$ and direct current $i_d$.

$$v_{dq}(\omega, \tau, i_d) = \begin{bmatrix} R & -N_P G_R \omega L \\ N_P G_R \omega L & R \end{bmatrix} \begin{bmatrix} i_d \\ \dfrac{\tau}{k_t G_R} \end{bmatrix} + k_c G_R w \begin{bmatrix} 0 \\ 1 \end{bmatrix}$$

Phase voltages can be found via inverse Clarke/Park transforms $$v_{abc} = K_c^\dagger K_p^T(\theta_c) v_{dq}(\omega, \tau, i_d)$$

Example 2

A non-limiting example dynamic model of n PMSMs in the new ladder topology is as follows.

The N Leg voltages of n PSMSs are determined via $$v_N =$$

$$S_n^\dagger \overline{K}_p^T \overline{v}_{dq}(\overline{\omega}, \tau, \overline{i}_d) = S_n^\dagger \begin{bmatrix} K_{p,1}^T & & & \\ & K_{p,2}^T & & \\ & & \ddots & \\ & & & K_{p,n}^T \end{bmatrix} \begin{bmatrix} v_{dq,1}(\omega_1, \tau_1, i_{d,1}) \\ v_{dq,2}(\omega_2, \tau_2, i_{d,2}) \\ \vdots \\ v_{dq,n}(\omega_n, \tau_n, i_{d,n}) \end{bmatrix} + 1_N v_2$$

where $v_z$ is common mode of all legs.

D. Hardware Example

Figure 10:
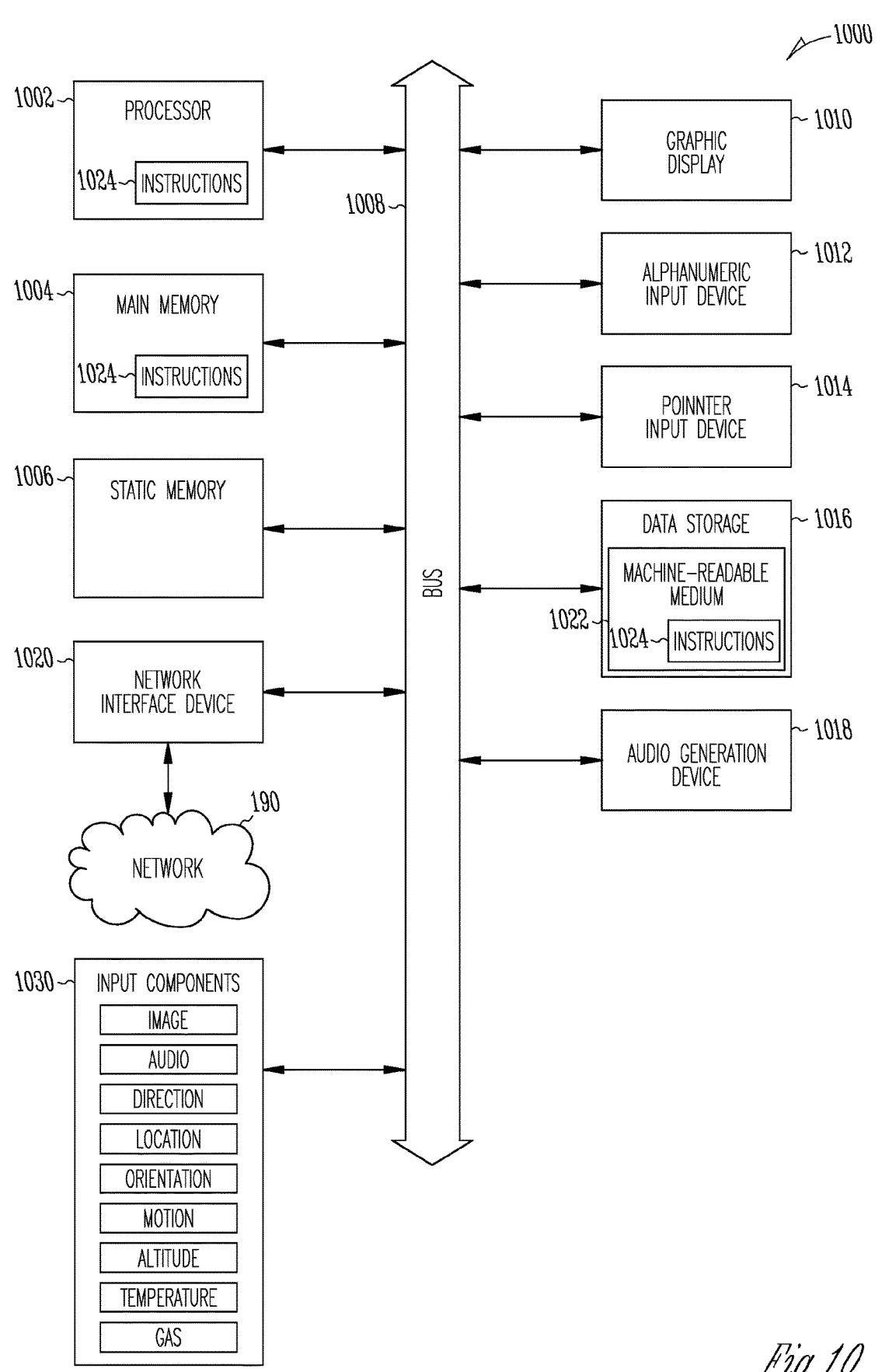
FIG. 10 is an illustrative block diagram representing components of an example machine according to some example embodiments, able to read instructions from a machine-readable medium and perform any one or more of the methodologies discussed herein, in whole or in part.

FIG. 10 is an illustrative block diagram representing components of an example computer system 1000, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the computer system 1000 in the example form of a computer system (e.g., a computer) within which the instructions 1024 (e.g., software, a program, an application, an applet, an app, or other executable code) for causing the computer system 1000 to perform any one or more of the methodologies discussed herein may be executed, in whole or in part.

In alternative embodiments, the computer system 1000 operates as a standalone device or may be communicatively coupled (e.g., networked) to other machines. In a networked deployment, the computer system 1000 may operate in the capacity of a server machine or a client machine in a server-client network environment, or as a peer machine in a distributed (e.g., peer-to-peer) network environment. The computer system 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the computer system 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The computer system 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The computer system 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the computer system 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the computer system 1000, such that the instructions 1024, when executed by one or more processors of the computer system 1000 (e.g., processor 1002), cause the computer system 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

E. Robotic Assembly Using Reduced-Leg VSI

Figure 11A:
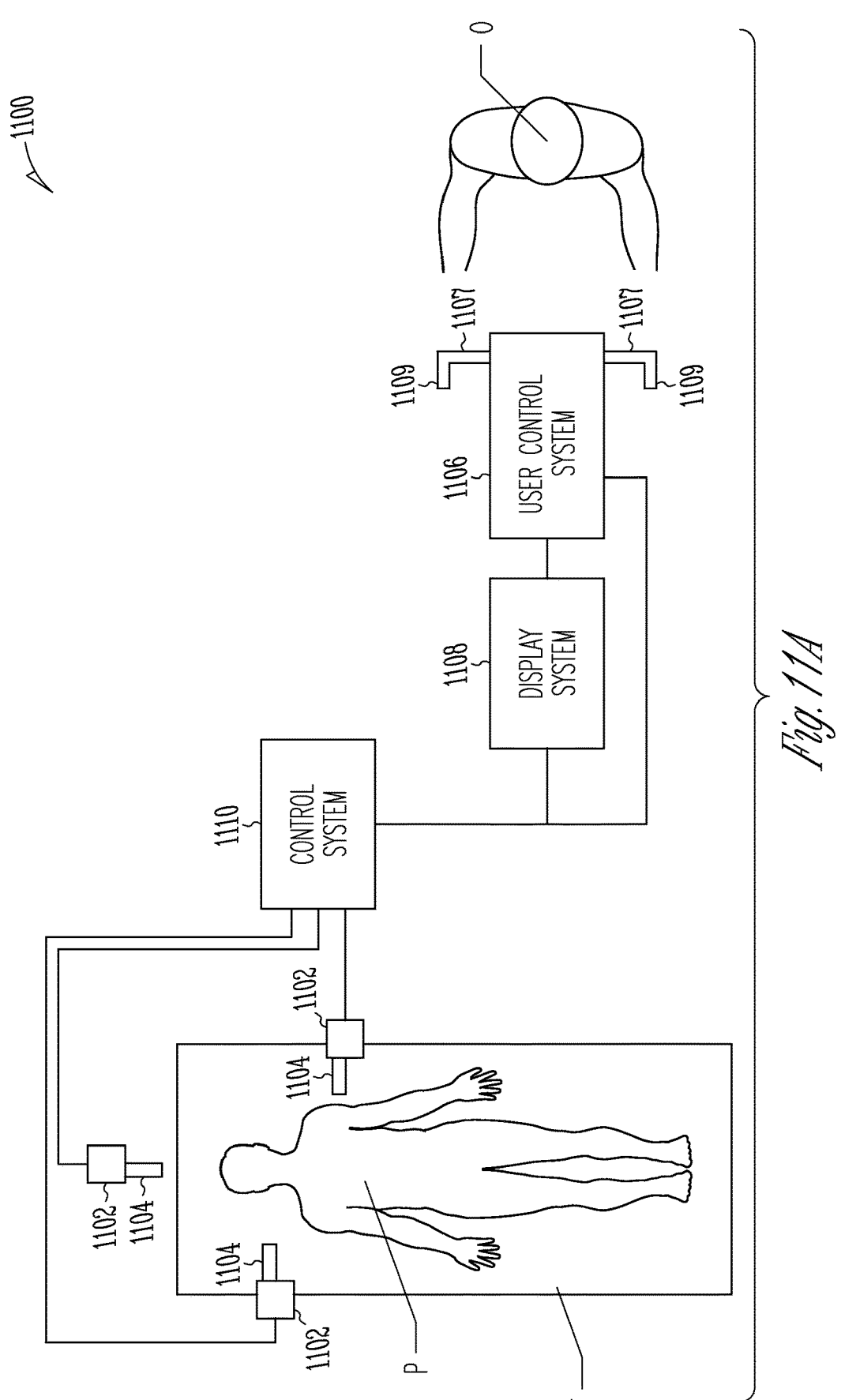
FIG. 11A is a simplified diagram of a medical system.

FIG. 11A is a simplified diagram of a medical system 1100 that is suitable for use in, for example, surgical, teleoperated surgical, diagnostic, therapeutic, or biopsy procedures. As used herein, the term "distal" means a location closer to a surgical site and the term "proximal" means a location farther away from the surgical site, unless otherwise indicated. The example system 1100 includes a plurality of manipulator assemblies 1102 and corresponding user control systems 1106 to allow one or more operators to control the teleoperated manipulator assemblies 1102 in various combinations. An example manipulator assembly 1102 is used to operate a medical instrument 1104 (e.g., a surgical instrument or an image capturing device) in performing various procedures on a patient P. An example user control system 1106 includes one or more input devices 1107 for controlling the manipulator assembly 1102 and includes one or more sensors 1109 to sense user-imparted motion of the input devices 1107. Example input devices 1107 may include any number of a variety of devices, such as joysticks, trackballs, data gloves, trigger-guns, hand-operated controllers, voice recognition devices, body motion or presence sensors, and/or the like. The input devices 1107 may be provided with the same degrees of freedom as an associated medical instrument 1104 controlled by the device to provide the operator O a strong sense of directly controlling the medical instrument 1104.

The system 1100 includes a display system 1108 for displaying an image or representation of the surgical site and the medical instrument 1104. The medical instrument 1104 may include a visualization system, which may include a viewing scope assembly that records a concurrent or real-time image of a surgical site and provides the image to the operator O and/or other operators or personnel through one or more displays of the system 1100, such as one or more displays of the display system 1108. The visualization system may be implemented as hardware, firmware, software, or a combination thereof that interact with or are otherwise executed by one or more computer processors that may include the processors of the control system 1110.

The system 1100 includes a control system 1110. An example control system 1110 includes at least one memory (not shown) and at least one computer processor (not shown) for effecting control between the multiple manipulator assemblies 1102, one or more medical instruments 1104, the user control system 1106, and the display system 1108. The control system 1110 also includes programmed instructions (e.g., a non-transitory machine-readable medium storing the instructions) to implement some or all the methods described in accordance with aspects of the present disclosure disclosed herein. Movement of the manipulator assembly 1102 may be controlled by the control system 1110 such that a shaft or intermediate portion of instruments mounted to the manipulator assemblies 1102 are constrained to safe motions through minimally invasive surgical access sites or other apertures. The user control system senses motion imparted by a user to the one or more input devices 1107 and communicates corresponding electronic signals to the control system 1110. The control system 1110 includes a computer processor (not shown) configured according to computer executable instructions to control movement of one or more instruments 1104 (or a tool), in response to signals provided by the control system 1106, in correspondence with user imparted motion of the one or more input devices 1107 sensed using the one or more sensors 1109.

Figure 11B:
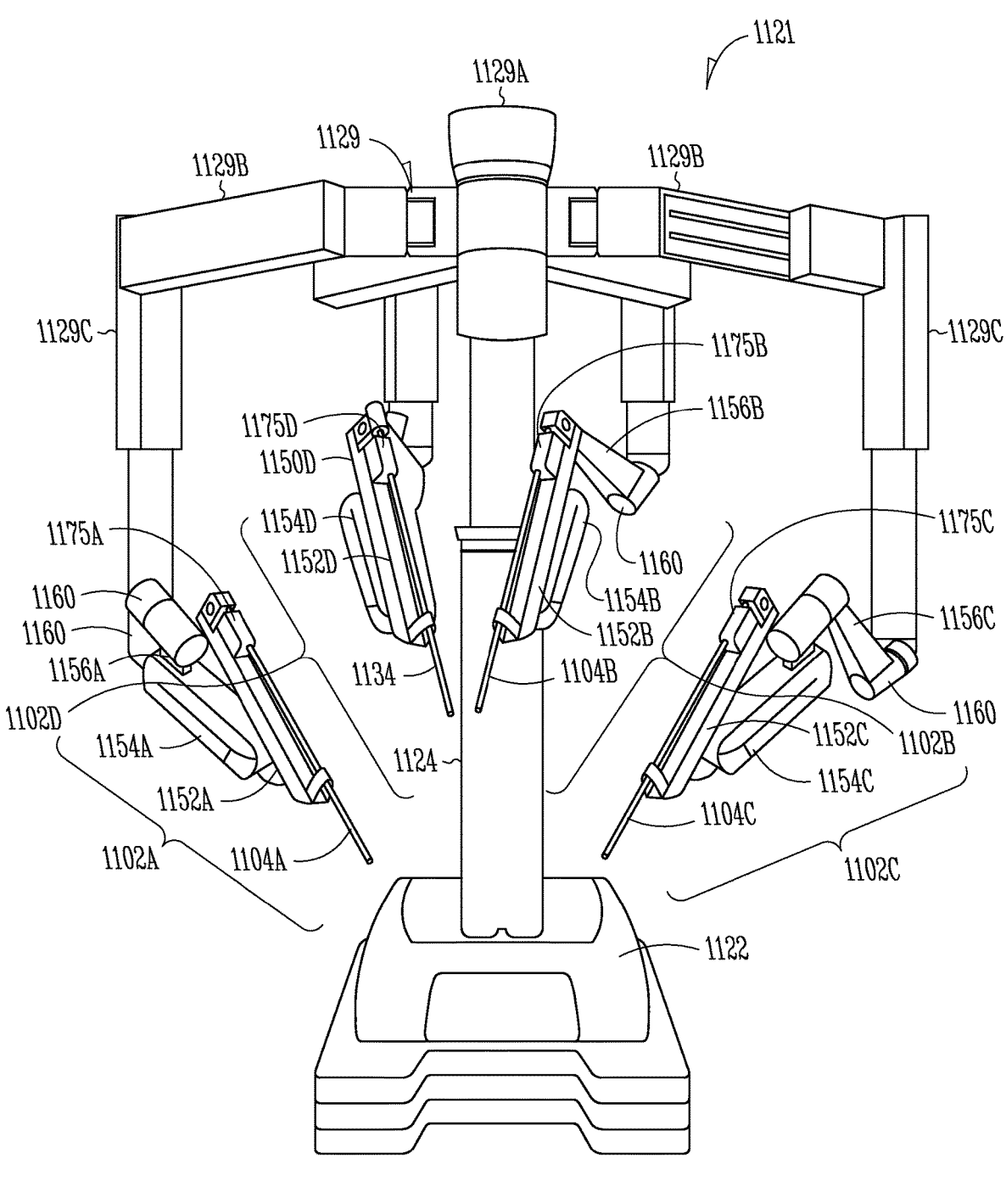
FIG. 11B is a perspective view of an example manipulator system of the medical system of FIG. 11A.

FIG. 11B is a perspective view of an example manipulator system 1121 configured in the form of a cart that that includes four manipulator assemblies 1102a, 1102b, 1102c, and 1102d that allow manipulation of three medical instruments 1104a, 1104b, 1104c, (e.g., the medical instrument 1104 of FIG. 11A), and a medical tool 1134 that may include an imaging device, such as a stereoscopic endoscope used for the capture of images of the work piece or of the site of the procedure (a "work site"). Each manipulator assembly 1102a-1102d includes a number of links 1152a-d to 1154a-d that are coupled together and manipulated through joints 1160 and that each includes a distally located carriage holder link 1152a-1152d that includes an instrument carriage 1175a-1175d on which to mount an instrument or tool. For example, manipulator assembly 1102c includes links 1152d, 1154d, 1156d that are coupled via joints 1160, and that includes carriage holder link 1152d that holds carriage 1175d. Each carriage 1175a-1175d mounts multiple motors, described below, used to impart motion to a surgical instrument or tool during a medical procedure. Images of the work site can include images of the distal ends of the medical instruments 1104a, 1104b, and 1104c when they are positioned within the field-of-view of the medical tool 1134. The example manipulating system 1121 included a drivable base 1122 connected to a telescoping column 1124, and the multiple manipulator assemblies 1102a-1102d. However, this is by way of example only, and in alternate embodiments, the manipulating system 1121 may be affixed to a table (e.g., a patient operating table), the ceiling, one or more walls, or any other fixture. The manipulator assemblies 1102a-1102d include movable joints 1160 for positioning the instrument holder links 1152a-1152d and an instrument or tool mounted thereon relative to the patient P. The manipulator assemblies 1102a-1102d are connected to a support structure 1129. An example support structure 1129 includes rotatable orienting platform 1129a coupled to rotatably orient telescoping horizontal cantilevers 1129b. The example support structure 1129 includes telescoping horizontal cantilevers 1129b coupled to vertically extending links 1129c. Horizontal movement of a horizontal cantilever 1129b causes horizontal movement of a vertically extending link 1129c coupled thereto. The example support structure 1129 includes the vertically extending links 1129c coupled to the manipulator assemblies 1102a-1102d. Rotational motion of the rotatable orienting platform 1129a and horizontal movement of a horizontal cantilever 1129b may be used to position of a vertically extending links 1129c and a manipulator assembly coupled thereto.

Figures 12A, 12B:
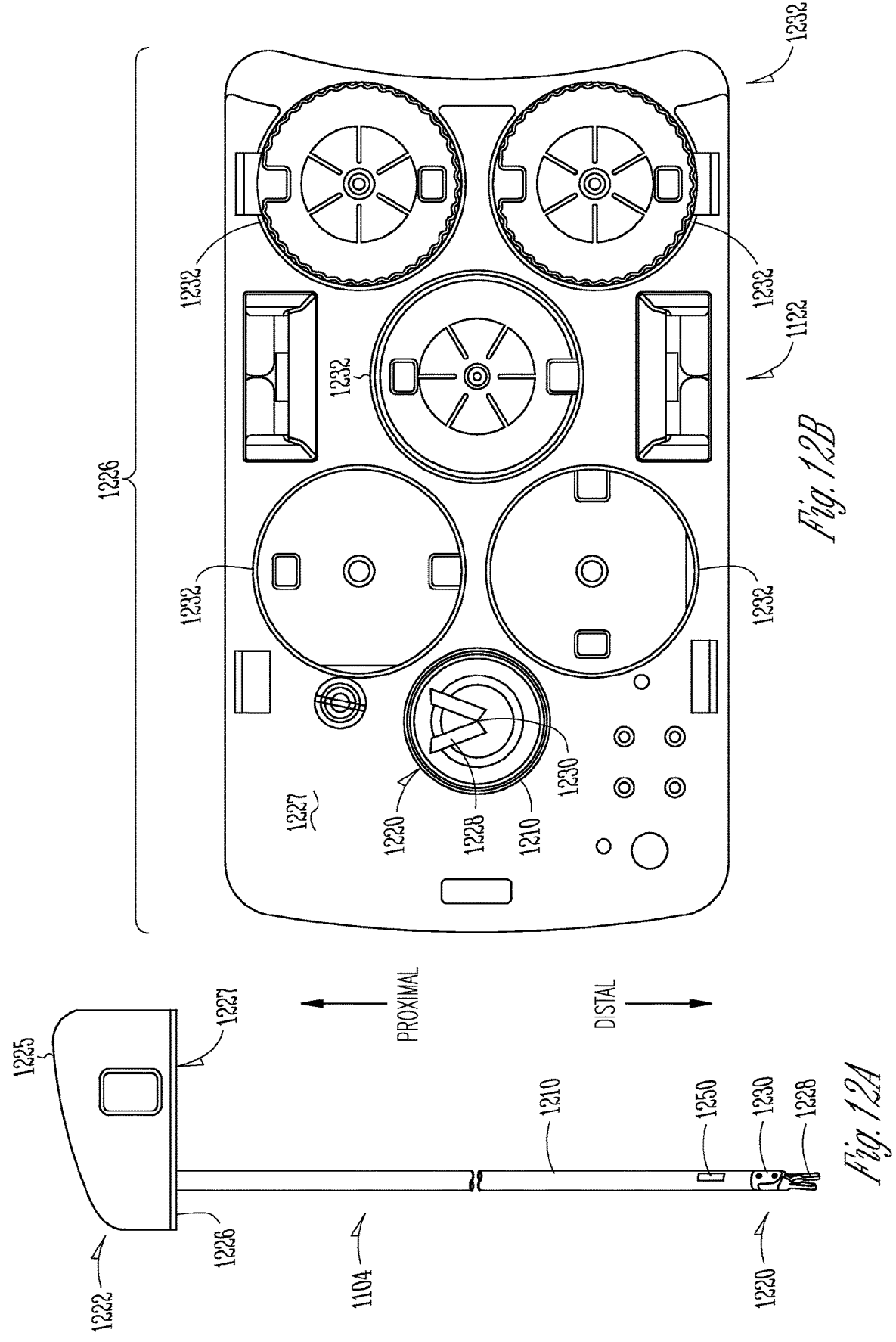
FIG. 12A is an illustrative side view of a surgical instrument
FIG. 12B is an illustrative bottom view of the surgical instrument showing the control surface of an input interface of the surgical instrument of FIG. 12A.

FIG. 12A is an illustrative side view of a surgical instrument 1104 including a tool distal portion 1220 and a proximal drive assembly 1222 coupled to one another by an elongate shaft 1210 defining an internal bore. Drive assembly 1222 includes a housing 1225 supporting an input interface 1226. Input interface 1226 includes an instrument control surface 1227. The input interface facilitates controlled adjustment of the instrument's end effector at the distal portion 1220 via a drive cable extending along an internal bore of the elongated tool shaft 1210. Input interface 1226 provides mechanical connections to other control features of surgical instrument 1104.

During use, instrument control surface 1227 of input interface 1226 couples to a surgical tool carriage 1175, which includes motors mechanically coupled to output drive couplings (not shown), described in further detail below to impart motor-driven rotational torques to drive input couplings 1232 at the control surface 1227 to control the surgical instrument 1104, as generally described above. Distal portion 1220 of surgical instrument 1104 may include any one of a variety of end effectors, such as the jaws 1228 shown, a needle driver, a cautery device, a cutting tool, an imaging device (e.g., an endoscope or ultrasound probe), or a combined device that includes a combination of two or more various tools and imaging devices. Further, in the illustrated example instrument 1104, end effector jaws 1228 are coupled to the elongate tool shaft 1210 by a wrist joint 1230, which allows the orientation of the jaws to be manipulated with reference to the elongated tool shaft 1224.

FIG. 12B is an illustrative bottom view of the surgical instrument 1104 of FIG. 12A showing the control surface 1227 of input interface 1226. It will be understood that the control surface 1227 is positioned over a carriage 1275, which includes motors (not shown) controlled by control signals produced in response to user input at an input device 1104. As shown, drive interface 1226 includes multiple drive input couplings 1232, each of which governs a different aspect of movement by wrist joint 1230 and end effector jaws 1228. More or fewer drive input coupling 1232 can be provided in different implementations. When control surface 1227 is coupled to tool carriage 1275, each of drive input coupling 1232 interfaces with an output drive coupling of the carriage 1275 to drive the drive input. In this example, drive input coupling 1232 are configured to form a direct mechanical engagement with respective rotary actuators (e.g., servo motors) of tool carriage 1275. Other suitable configurations for rotary or linear mechanical power transmission can also be used (e.g., indirect mechanical couplings, including speed and/or torque converters, fluid couplings, and/or electrical couplings).

Figure 13A:
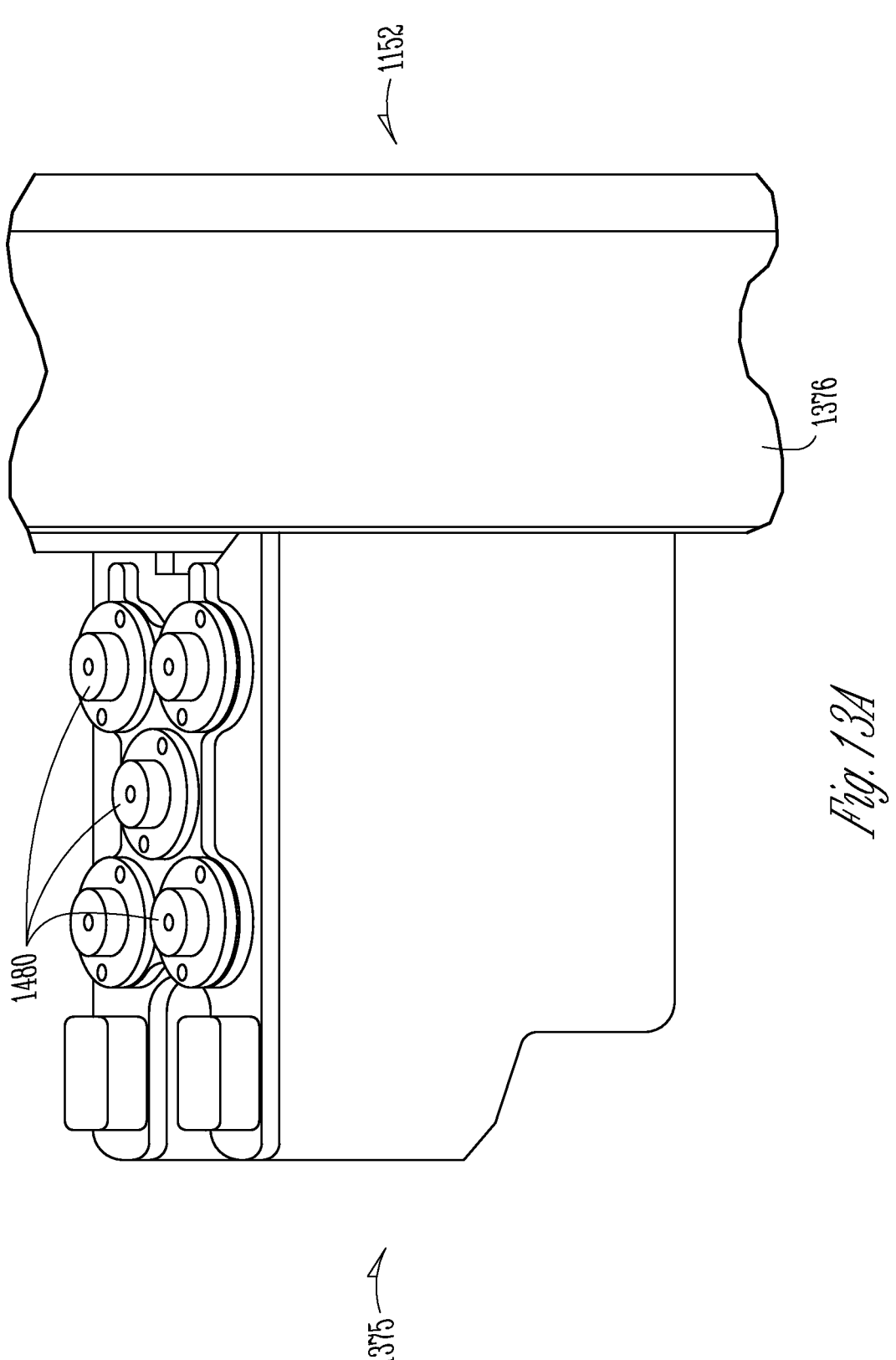
FIGS. 13A-13B are illustrative perspective views of an example carriage and a carriage holder link.
Figure 13B:
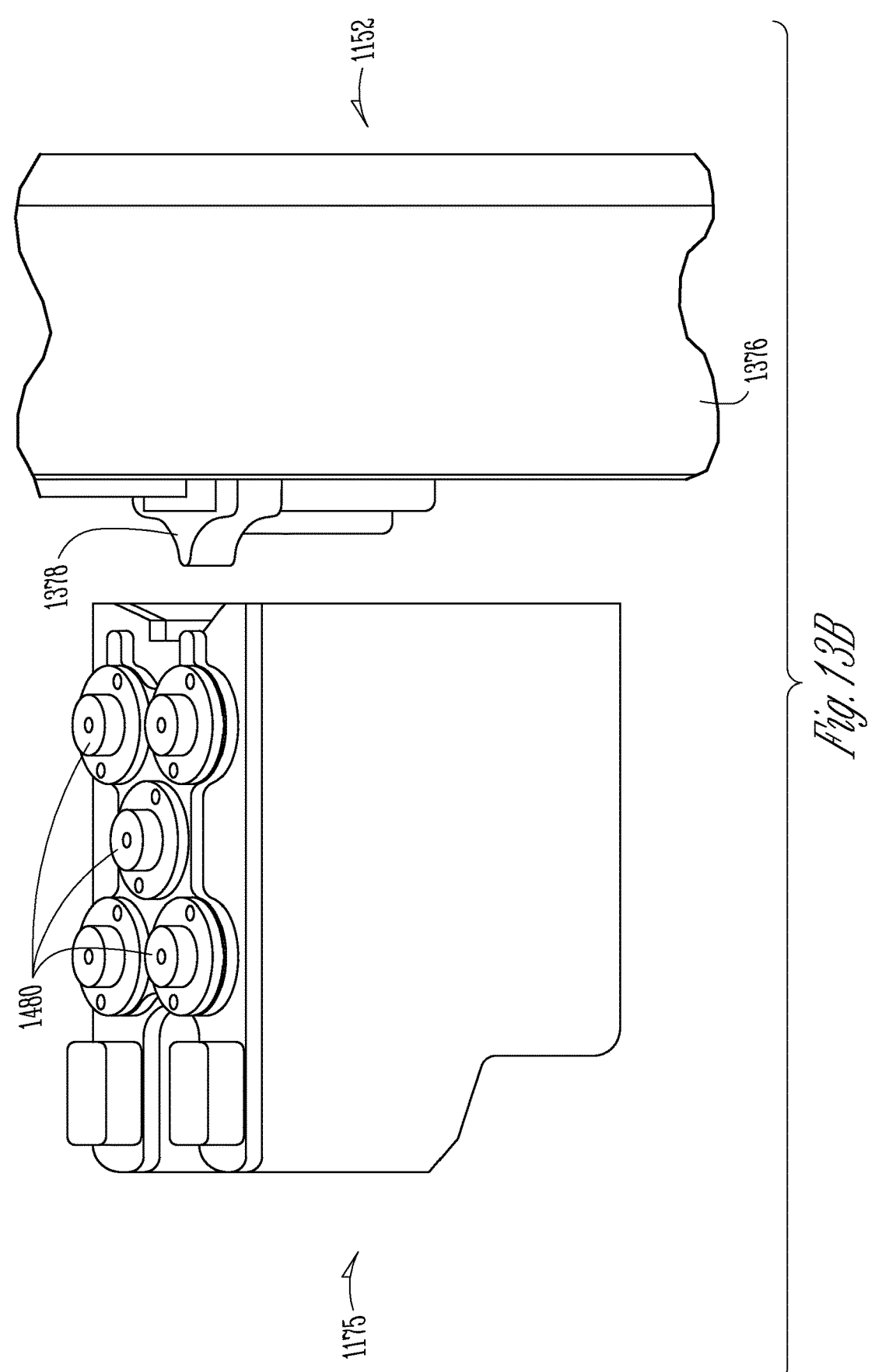

FIGS. 13A-13B are illustrative perspective views of an example carriage 1175 and a carriage holder link 1152. The example carriage holder link 1152 includes a carriage holder link base member 1376 and a fitting 1378 slideably mounted to a carriage holder link base member 1376. The carriage holder link base member 1376 includes a carriage drive mechanism (not shown) that is operable to selectively translate the fitting 1378 along the carriage holder base member 1376, thereby translating the carriage 1175 along the carriage holder link base member 1376 along an insertion axis of a surgical instrument (not shown) mounted to the carriage 1175.

An example carriage 1175 includes five output drive couplings 1480a, 1480b, 1480c, 1480d, and 1480e. Each of the output drive couplings 1480 is configured to drivingly couple with a corresponding drive input coupling 1232 of a surgical instrument or tool when the instrument or tool is mounted to the example carriage 1175. Each of the five output drive couplings 1480a-1480e can be independently actuated to actuate a corresponding mechanism of a mounted surgical instrument. For example, one of the output drive couplings 1480 can be used to rotate an example elongated shaft 1210 of the example surgical instrument 1104, one of the output drive couplings 1480 can be used to articulate an example end effector 1228 of the example surgical instrument 1104 around a first axis (e.g., pitch axis), one of the output drive couplings 1480 can be used to articulate an example end effector 1228 around a second axis (e.g., yaw axis) that is perpendicular to the first axis, one of the output drive couplings 1480 can be used to articulate a clamping jaw of the end effector, and one of the output drive couplings 1480 can be used to articulate a stapling and cutting cartridge of an example end effector 1228. While the example carriage 1175 includes five output drive couplings 1480, a carriage can be configured with any suitable number of output drive couplings.

Figure 14:
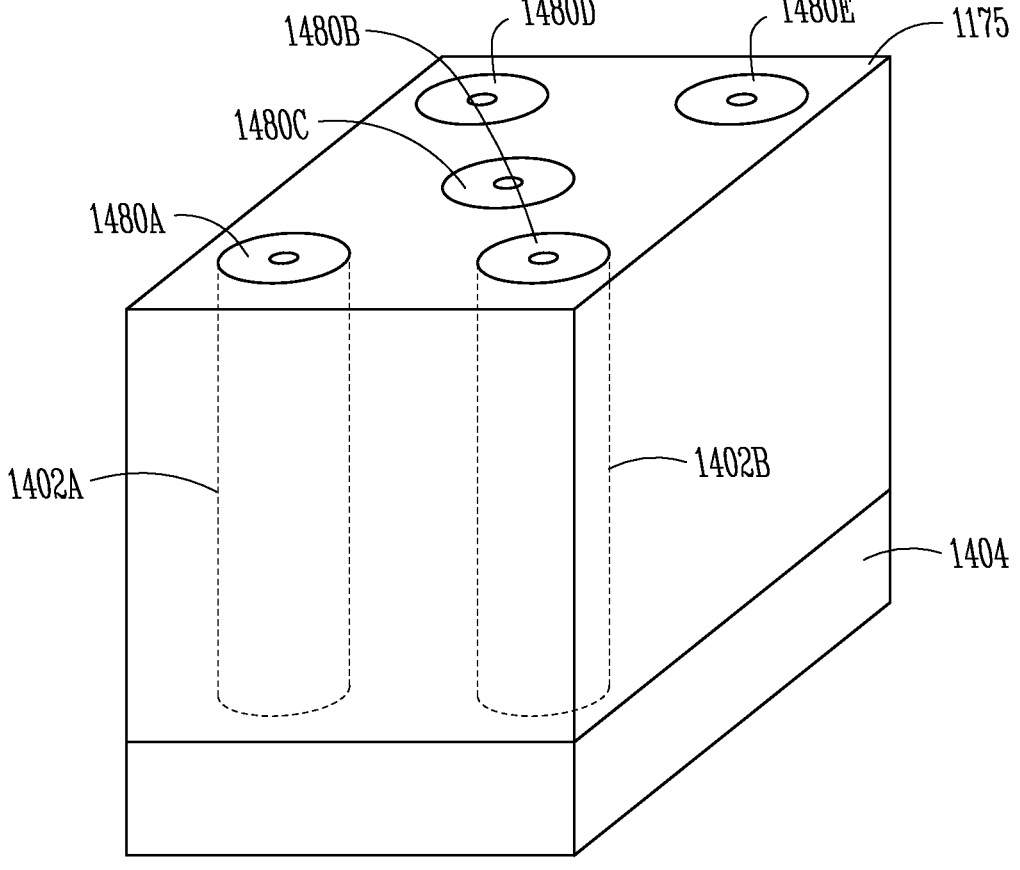
FIG. 14 is an illustrative partially transparent view of an example carriage 1175 that houses multiple motors and a voltage source inverter (VSI) circuitry block to provide power electrical signals to power the motors.

FIG. 14 is an illustrative partially transparent view of an example carriage 1175 housing multiple motors 1402a, 1402b, 1402c, 1402d, and 1402e (not all visible) and a voltage source inverter (VSI) circuitry block 1404 to provide power electrical signals to power the motors. The example carriage 1175 includes a housing 1406 that encloses the motors 1402a-1402e and the VSI circuitry block 1404 and that is mountable to an example carriage holder link 1152 as described above with reference to FIGS. 13A-13B. Each of the motors 1402a-1402e is mechanically coupled to impart rotational force to a corresponding output drive coupling 1480a-1480e, to transfer articulation forces to a corresponding one of the input drive couplings 1232 of an instrument or tool.

Figure 15B:
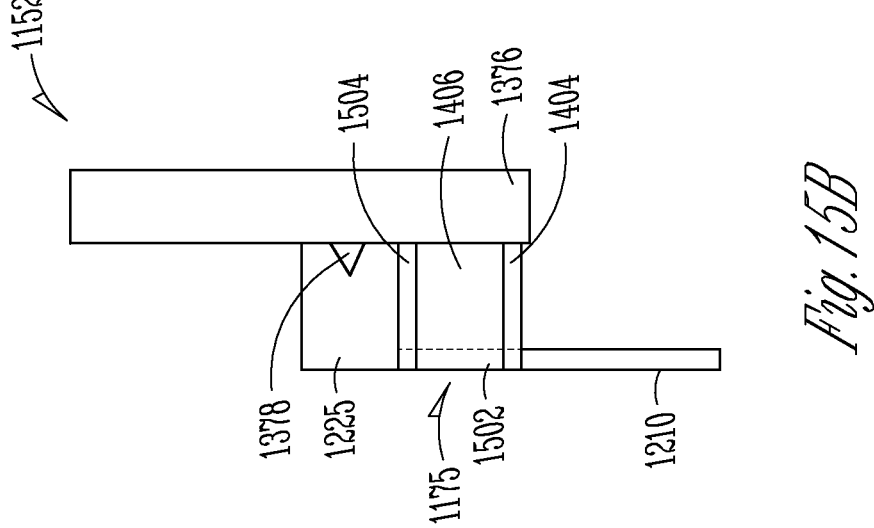
FIG. 15B is an illustrative drawing showing the example instrument mounted upon the carriage with the carriage located in a distal position upon the example carriage holder link.
Figure 15A:
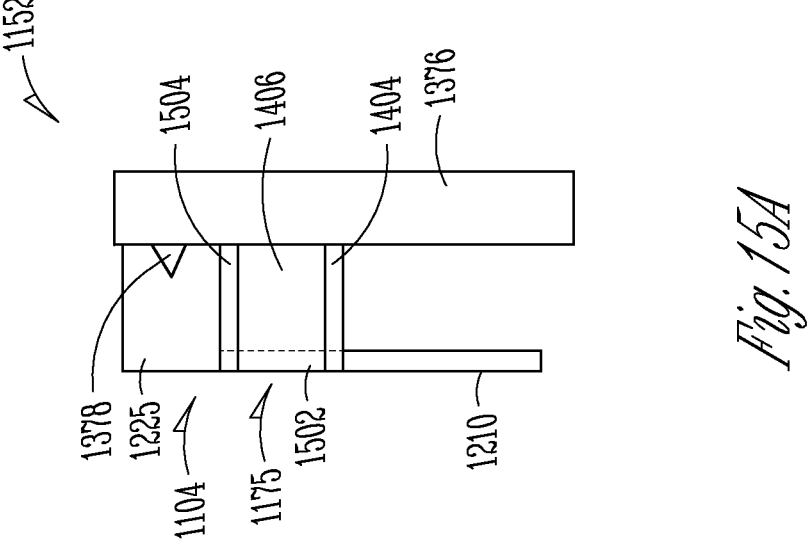
FIG. 15A is an illustrative drawing showing an instrument mounted upon a carriage with the carriage located in a proximal position upon an example carriage holder link.

FIG. 15A is an illustrative drawing showing an example instrument 1104 mounted upon an example carriage 1175 with the carriage located in a proximal position upon an example carriage holder link 1152. FIG. 15B is an illustrative drawing showing the example instrument 1104 mounted upon the carriage 1175 with the carriage located in a distal position upon the example carriage holder link 1152. The carriage 1175 includes a housing 1406 that defines a slot 1502 (indicated by dashed lines) in which a portion of the example instrument's (or tool's) shaft 1210 extends when the instrument (or tool) is mounted to the carriage 1175, such that individual motor output drive couplings 1480a-1480e (not shown) are operatively coupled to drive individual instrument drive input couplings 1232. Optionally, an example medical system 100 may include a mechanical adapter interface 1504 that is operatively coupled between the motor output drive couplings 1480a-1480e and the instrument drive input couplings 1232, to provide a sterile barrier between a sterilized instrument and a non-sterile manipulator. The example carriage's fitting 1378 with the carriage 1175 mechanically coupled thereto are moveable along the carriage holder base member 1376 to move the carriage 1175 between the distal and proximal positions shown in FIGS. 15A-15B.

Figure 16:
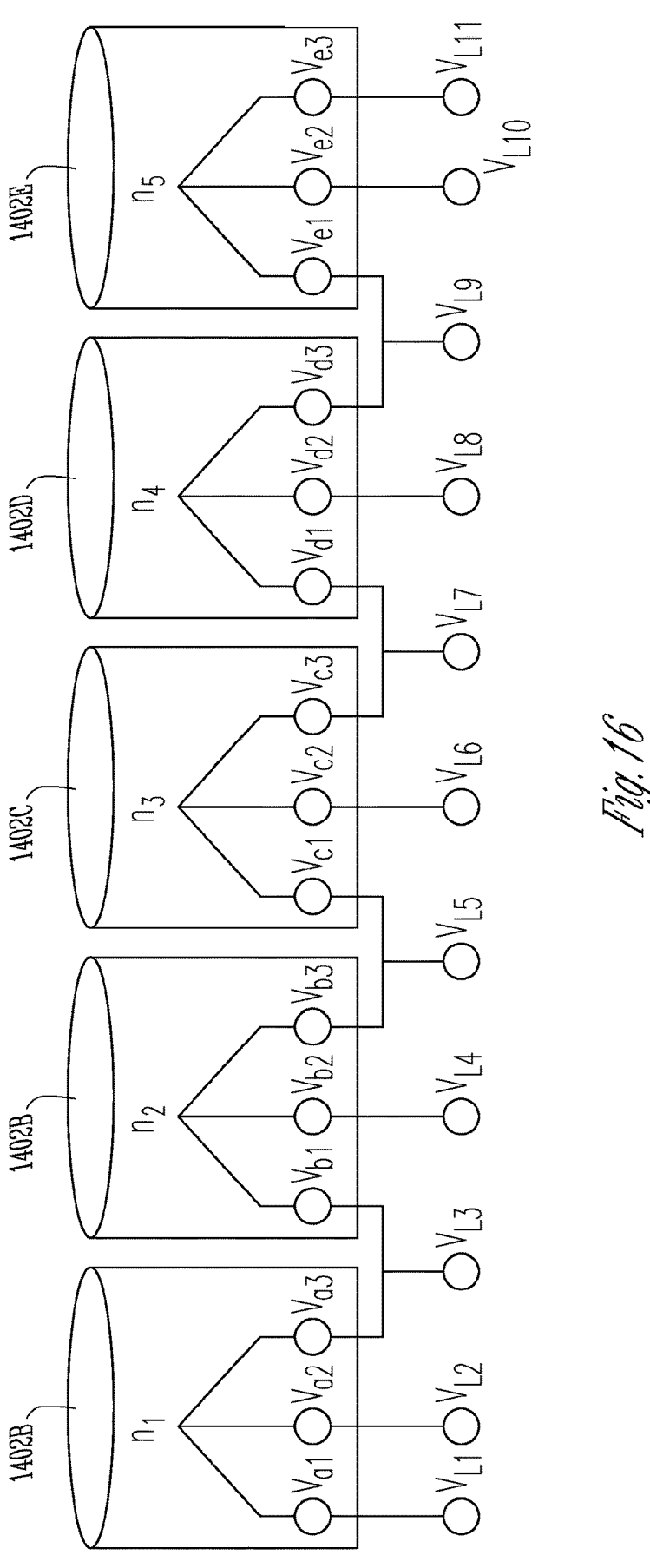
FIG. 16 is an illustrative schematic diagram showing electrical coupling between VSI leg circuits and motor phase circuits.

FIG. 16 is an illustrative schematic diagram showing electrical coupling between VSI leg circuits and motor phase circuits. A first motor includes phase va1, va2 and va3. A second motor includes phase vb1, vb2 and vb3. A third motor includes phases vc1, vc2, and vc3. A fourth motor includes phases vd1, vd2, and vd3. A fifth motor includes phases ve1, ve2, and ve3. A first VSI leg VL1 is electrically coupled to drive phase va1. A second VSI leg VL2 is electrically coupled to drive phase va2. A third VSI leg VL3 is electrically coupled to drive phase va3 and phase vb1. A fourth VSI leg VL4 is electrically coupled to drive phase vb2. A fifth VSI leg VL5 is electrically coupled to drive phase vb3 and vc1. A sixth VSI leg VL6 is electrically coupled to drive phase vc2. A seventh VSI leg VL7 is electrically coupled to drive phase vc3 and phase vd1. An eighth VSI leg VL8 is electrically coupled to drive phase vd2. A ninth VSI leg VL9 is electrically coupled to drive phase vd3 and phase ve1. A tenth VSI leg VL10 is electrically coupled to drive leg ve2. An eleventh VSI leg VL11 is electrically coupled to drive phase ve3. While the example carriage 1175 is mechanically coupled to and houses five motors, it will be understood that an example carriage (not shown) can be configured to mount a larger number of motors and a correspondingly larger number of inverters legs can be configured to drive the larger number of motors using shared-VSI legs according to the principles disclosed herein.

Power switches such as power switches 108, 110 of inverter legs 106$_1$, 106$_2$, 106$_3$ typically are physically relatively large. As a result, in prior example medical systems that included manipulator assemblies and mechanical coupling similar to that shown and described with reference to FIG. 11A-FIG. 15, the inverter legs were not located at the carriage 1175 or at a holder link 1152. Rather, the inverters legs typically were located at a link of the manipulator assembly more proximal to the holder link 1152 such as at link 1154 or link 1156. The power switches of the inverter legs were physically too large to be located at the carriage 1175 or at the holder link 1152. As a result, in such earlier example medical system, electrical relatively long wires (not shown) were used to transmit power signals from the power switches to the motors 1480 housed within the carriage. Unfortunately, the transmission of power over relatively long wire lengths resulted in significant power dissipation, which required more power to drive the motors. Moreover, the positioning of the power electronics circuitry (the inverter legs) at a location separate from the motors e.g., not at the carriage 1175 and not at the holder link 1152 on a different resulted in increased difficulty in manufacture of the earlier medical system and difficulty during field service of the earlier medical system.

Sharing of inverter legs as disclosed herein reduces the number of inverter legs, and therefore, correspondingly reduces the number of power switches, required to drive the motors. The reduction of the number of power switches reduces the physical size of the power inverter circuitry, which makes possible the location of the power circuitry at the carriage 1175 located at the holder link 1152. As a result, there is no need for long wires to communicate power signals from the power switches of the inverter legs to the motors, and power consumption is reduced. Moreover, the medical system can be more easily manufactured and serviced since the power switches and the motors that power are co-located within the system.

Power reduction and physical size reduction of a VSI circuitry block 1404 scale linearly with reduction in the number of inverter legs. An example carriage 1175 includes five motors 1402$a$, 1402$b$, 1402$c$, 1402$d$, and 1402$e$ and 2n+1=11 inverter legs (n=5). A conventional arrangement of five motors with three inverter legs each includes 15 inverter legs. The power and size reduction achieved using the VSI 1404 shared inverter legs disclosed herein is approximately 26% (15−11/15).

F. Various Examples

Example 1 can include a system comprising: a first motor, a second motor, and a third motor, each respective motor comprising three phases; and a voltage source inverter circuit comprising multiple respective inverter legs; each respective inverter leg coupled to drive at least one phase of at least one of the respective motors; wherein a first shared inverter leg is coupled to drive a first phase of the first motor and drive third phase of the second motor; and wherein a second shared inverter leg is coupled to drive a third phase of the second motor and a first phase of the third motor.

Example 2 can include the subject matter of Example 1 further including: a fourth motor comprising three phases; wherein a third shared inverter leg is coupled to drive a third phase of the third motor and drive a first phase of the fourth motor.

Example 3 can include the subject matter of Example 2 further including: a fifth motor comprising three phases; wherein a fifth shared inverter leg is coupled to drive a third phase of the fourth motor and drive a first phase of the fifth motor.

Example 4 can include the subject matter of Example 1 wherein a first exclusive inverter leg is coupled to drive a second phase of the first motor; wherein a second exclusive inverter leg is coupled to drive a second phase of the second motor; wherein a third exclusive inverter leg is coupled to drive a second phase of the third motor; and wherein a fourth exclusive inverter leg is coupled to drive a third phase of the third motor.

Example 5 can include the subject matter of Example 2, wherein a first exclusive inverter leg is coupled to drive a second phase of the first motor; wherein a second exclusive inverter leg is coupled to drive a second phase of the second motor; wherein a third exclusive inverter leg is coupled to drive a second phase of the third motor; wherein a fourth exclusive inverter leg is coupled to drive a second phase of the fourth motor; and wherein a fifth exclusive inverter leg is coupled to drive a third phase of the fourth motor.

Example 6 can include the subject matter of Example 3, wherein a first exclusive inverter leg is coupled to drive a second phase of the first motor; wherein a second exclusive inverter leg is coupled to drive a second phase of the second motor; wherein a third exclusive inverter leg is coupled to drive a second phase of the third motor; wherein a fourth exclusive inverter leg is coupled to drive a second phase of the fourth motor; wherein a fifth exclusive inverter leg is coupled to drive a second phase of the fifth motor; and wherein a sixth exclusive inverter leg is coupled to drive a third phase of the fifth motor.

Example 7 can include the subject matter of Example 1, wherein the first, second, and third motors each includes a permanent magnet synchronous motor.

Example 8 can include the subject matter of Example 1, wherein the first, second, and third motors each includes a brushless direct current motor.

Example 9 can include the subject matter of Example 1, wherein the first, second, and third motors each includes an induction motor.

Example 10 can include the subject matter of Example 1, wherein each respective inverter leg includes a respective first switch coupled between a respective output voltage node and a bus voltage and a respective second switch coupled between the respective output voltage node and a ground voltage.

Example 11 can include the subject matter of Example 1, wherein each respective inverter leg includes a respective first transistor switch coupled between a respective output voltage node and a bus voltage and a respective second transistor switch coupled between the respective output voltage node and a ground voltage.

Example 12 can include the subject matter of Example 10, wherein the first phase of the first motor is coupled between a neutral node of the first motor and a respective output node of the first shared leg and the third phase of the second motor is coupled between a neutral node of the second motor and the respective output node of the first shared leg; and wherein the third phase of the second motor is coupled between the neutral node of the second motor and a respective output node of the second shared leg and the first phase of the second motor is coupled between the neutral node of the second motor and the respective output node of the second shared leg.

Example 13 can include the subject matter of Example 12, wherein a second phase of the first motor is coupled between the neutral node of the first motor and a respective output node of a first exclusive leg; wherein a second phase of the second motor is coupled between the neutral node of the second motor and a respective output node of a second exclusive leg; and wherein a second phase of the third motor is coupled between a neutral node of the third motor and a respective output node of a third exclusive leg.

Example 14 can include the subject matter of Example 13, wherein a third phase of the third motor is coupled between a neutral node of the third motor and a respective output node of a fourth exclusive leg.

Example 15 can include the subject matter of Example 1, further including: a commutation control circuit including, a first voltage transformation block to transform first, second and third sets of space vector voltage signals, corresponding to the first, second, and third motors, to multiple phase voltage signals that include a first shared phase signal and a second shared phase signal; and a duty cycle block to modulate the first and second shared phase voltage signals and add a common mode voltage value to the first and second shared phase voltage signals to produce corresponding first and second input control signals; wherein the first shared inverter leg imparts a first shared excitation signal to the first phase of the first motor and the third phase of the second motor, in response to the first input control signal; and wherein the second shared inverter leg imparts a second shared excitation signal to the third phase of the second motor and the first phase of the third motor, in response to the second input control signal.

Example 16 can include the subject matter of Example 15, wherein the multiple phase voltage signals includes a first exclusive phase signals; wherein the duty cycle circuit to modulate the first exclusive phase signal and add the common mode voltage value to the first exclusive phase signals to produce a corresponding third input control signal; wherein a first exclusive inverter leg imparts a first exclusive excitation signal in response to the third input control signal.

Example 17 can include the subject matter of Example 15 further including: one or more second voltage transform blocks that for each of one of the respective first, second, and third motors, transforms a respective rotating two-axis coordinate system of the respective motor, based upon respective angular position of a respective rotor of the respective motor, to a respective set of space vector voltage signals in a respective stationary two-axis space vector coordinate system of a respective stationary stator of the respective motor; whereby the one or more second voltage transform blocks produce the first, second, and third sets of space vector voltage signals.

Example 18 can include a method comprising: imparting a first shared excitation signal to drive a first phase of a first electric motor and drive third phase of the second electric motor; and imparting a second shared excitation signal to drive a third phase of the second motor and a first phase of the third motor.

Example 19 can include the subject matter of Example 18 further including: imparting a third shared excitation signal to drive a third phase of the third motor and drive a first phase of a fourth motor.

Example 20 can include the subject matter of Example 18 further including: imparting a fifth shared excitation signal to drive a third phase of a fourth motor and drive a first phase of the fifth motor.

Example 21 can include the subject matter of Example 18 further including: imparting a first exclusive excitation signal to drive a second phase of the first motor; imparting a second exclusive excitation signal to drive a second phase of the second motor; imparting a third exclusive excitation signal to drive a second phase of the second motor; and imparting a third exclusive excitation signal to drive a third phase of the second motor.

Example 22 can include the subject matter of Example 19, further including: imparting a first exclusive excitation signal to drive a second phase of the first motor; imparting a second exclusive excitation signal to drive a second phase of the second motor; imparting a third exclusive excitation signal to drive a second phase of the third motor; imparting a fourth exclusive excitation signal to drive a second phase of the fourth motor; and imparting a fifth exclusive excitation signal to drive a third phase of the fourth motor.

Example 23 can include the subject matter of Example 20, further including: imparting a first exclusive excitation signal to drive a second phase of the first motor; imparting a second exclusive excitation signal to drive a second phase of the second motor; imparting a third exclusive excitation signal to drive a second phase of the third motor; imparting a fourth exclusive excitation signal to drive a second phase of a fourth motor; imparting a fifth exclusive excitation signal to drive a second phase of a fifth motor; and imparting a sixth exclusive excitation signal to drive a third phase of the fifth motor.

Example 24 can include a system comprising: a first motor, a second motor, and a third motor, each respective motor comprising three phases; a voltage source inverter circuit comprising multiple respective inverter legs; a commutation control circuit including, a first voltage transformation block to transform first, second and third sets of space vector voltage signals, corresponding to the first, second, and third motors, to multiple phase voltage signals that include a first shared phase signal and a second shared phase signal; the commutation control circuit including a duty cycle block to modulate the first and second shared phase voltage signals and add a common mode voltage value to the first and second shared phase voltage signals to produce corresponding first and second input control signals; wherein a first inverter leg of the voltage source inverter circuit is coupled to impart a first shared excitation signal to a first phase of the first motor and a third phase of the second motor, in response to the first input control signal; and wherein a second inverter leg of the voltage source inverter circuit is coupled to impart a second shared excitation signal to a third phase of the second motor and the first phase of the third motor, in response to the second input control signal.

Example 25 can include the subject matter of Example 24, wherein the multiple phase voltage signals include a first exclusive phase signal; wherein the duty cycle circuit to modulate the first exclusive phase signal and add the common mode voltage value to the first exclusive phase signals to produce a corresponding third input control signal; wherein a third inverter leg of the voltage source inverter circuit is coupled to impart a first exclusive excitation signal to only one phase of one motor, in response to the third input control signal.

Example 26 can include the subject matter of Example 24 further including: one or more second voltage transform blocks that for each of one of the respective first, second, and third motors, transforms a respective rotating two-axis coordinate system of the respective motor, based upon respective angular position of a respective rotor of the respective motor, to a respective set of space vector voltage signals in a respective stationary two-axis space vector coordinate system of a respective stationary stator of the respective motor; whereby the one or more second voltage transform blocks produce the first, second, and third sets of space vector voltage signals.

Example 27 can include a system comprising: a manipulator comprising a first link and an instrument carriage coupled to the first link; the instrument carriage configured for detachably mounting an instrument to the instrument carriage, the instrument carriage comprising: a motor housing; multiple drive motors, each of the drive motors having at least three phases, each of the drive motors being coupled to the motor housing; multiple output drive couplings, each of the output drive couplings being operably coupled with a corresponding one of the drive motors, each of the output drive couplings being configured to drivingly couple with a corresponding input drive coupling of the instrument; a voltage source inverter circuit comprising multiple inverter legs, wherein the voltage source inverter circuit is coupled to the motor housing, and each respective inverter leg coupled to drive at least one phase of at least one of the respective motors; wherein an inverter leg of the multiple inverter legs is coupled to drive a common one of the three phases of each of two of the motors; and wherein a different inverter leg of the multiple inverter legs is coupled to drive a different common one of the three phase of each of two of the motors.

Example 28 can include the subject matter of Example 27 further including: a fixture configured to slidably couple the carriage to the first link.

Example 29 can include the subject matter of Example 27, wherein the multiple motors include at least three motors.

Example 30 can include the subject matter of Example 27, wherein the multiple motors include at least five motors.

Example 31 can include the subject matter of Example 27 further including: a support structure; a second link; the second link operably coupled to the support structure; and the second link operably coupled to the first link.

Example 32 can include the subject matter of Example 27 further including: one or more input devices coupled to a computer processor configured according to computer executable instructions to control movement of one or more instruments in correspondence with user imparted motion of the one or more input devices.

The invention claimed is:

1. A system comprising:
a first motor, a second motor, and a third motor, each respective motor comprising three phases; and
a voltage source inverter circuit comprising multiple respective inverter legs;
each respective inverter leg coupled to drive at least one phase of at least one of the respective motors;
wherein multiple respective inverter legs comprise at least a first shared inverter leg and a second shared inverter leg;
wherein the first shared inverter leg is coupled to drive a third phase of the first motor and drive a first phase of the second motor; and
wherein the second shared inverter leg is coupled to drive a third phase of the second motor and a first phase of the third motor.

2. The system of claim 1 further comprising:
a fourth motor comprising three phases;
wherein a third shared inverter leg is coupled to drive a third phase of the third motor and drive a first phase of the fourth motor.

3. The system of claim 2 further comprising:
a fifth motor comprising three phases;
wherein a fourth shared inverter leg is coupled to drive a third phase of the fourth motor and drive a first phase of the fifth motor.

4. The system of claim 3,
wherein a first exclusive inverter leg is coupled to drive a first phase of the first motor;
wherein a second exclusive inverter leg is coupled to drive a second phase of the first motor;
wherein a third exclusive inverter leg is coupled to drive a second phase of the second motor;
wherein a fourth exclusive inverter leg is coupled to drive a second phase of the third motor;
wherein a fifth exclusive inverter leg is coupled to drive a second phase of the fourth motor;
wherein a sixth exclusive inverter leg is coupled to drive a second phase of the fifth motor; and
wherein a seventh exclusive inverter leg is coupled to drive a third phase of the fifth motor.

5. The system of claim 2,
wherein a first exclusive inverter leg is coupled to drive a first phase of the first motor;
wherein a second exclusive inverter leg is coupled to drive a second phase of the first motor;
wherein a third exclusive inverter leg is coupled to drive a second phase of the second motor;
wherein a fourth exclusive inverter leg is coupled to drive a second phase of the third motor; and
wherein a fifth exclusive inverter leg is coupled to drive a second phase of the fourth motor.

6. The system of claim 1,
wherein a first exclusive inverter leg is coupled to drive a first phase of the first motor;
wherein a second exclusive inverter leg is coupled to drive a second phase of the first motor;
wherein a third exclusive inverter leg is coupled to drive a second phase of the second motor; and
wherein a fourth exclusive inverter leg is coupled to drive a second phase of the third motor.

7. The system of claim 1,
wherein the first, second, and third motors each includes a permanent magnet synchronous motor.

8. The system of claim 1,
wherein the first, second, and third motors each includes a brushless direct current motor.

9. The system of claim 1,
wherein the first, second, and third motors each includes an induction motor.

10. The system of claim 1,
wherein each respective inverter leg includes a respective first switch coupled as a voltage pull-up switch between a respective center tap voltage node and a bus voltage and a respective second switch coupled as a voltage pull-down switch to between the respective center tap voltage node and a ground voltage.

11. The system of claim 10,
wherein the third phase of the first motor is coupled between a neutral node of the first motor and a respective center tap node of the first shared inverter leg and the first phase of the second motor is coupled between a neutral node of the second motor and the respective center tap node of the first shared inverter leg; and
wherein the third phase of the second motor is coupled between the neutral node of the second motor and a respective center tap node of the second shared inverter leg and the first phase of the third motor is coupled between the neutral node of the third motor and the respective center tap node of the second shared inverter leg.

12. The system of claim 11,
wherein a second phase of the first motor is coupled between the neutral node of the first motor and a respective center tap node of a second exclusive leg;
wherein a second phase of the second motor is coupled between the neutral node of the second motor and a respective center tap node of a third exclusive leg; and
wherein a second phase of the third motor is coupled between a neutral node of the third motor and a respective center tap node of a fourth exclusive leg.

13. The system of claim 12,
wherein a third phase of the third motor is coupled between a neutral node of the third motor and a respective center tap node of a third shared inverter leg.

14. The system of claim 1,
wherein each respective inverter leg includes a respective first transistor switch coupled as a voltage pull-up switch between a respective center tap voltage node and a bus voltage and a respective second transistor switch coupled as a voltage pull-down switch between the respective center tap voltage node and a ground voltage.

15. The system of claim 1, further including:
a commutation control circuit including,
a first voltage transformation block to transform first, second and third sets of space vector voltage signals, corresponding to the first, second, and third motors, to multiple phase voltage signals that include a first shared phase voltage signal and a second shared phase voltage signal; and
a duty cycle block to modulate the first shared phase voltage signal and the second shared phase voltage signals and add a common mode voltage value to the first and second shared phase voltage signals to produce corresponding first and second input control signals;
wherein the first shared inverter leg imparts a first shared excitation signal to the third phase of the first motor and the first phase of the second motor, in response to the first input control signal; and wherein the second shared inverter leg imparts a second shared excitation signal to the third phase of the second motor and the first phase of the third motor, in response to the second input control signal.

16. The system of claim 15,
wherein the multiple phase voltage signals include a first exclusive phase signal;
wherein the duty cycle block modulates the first exclusive phase signal and adds the common mode voltage value to the first exclusive phase signals to produce a corresponding third input control signal; and
wherein a first exclusive inverter leg imparts a first exclusive excitation signal in response to the third input control signal.

17. The system of claim 15 further comprising:
one or more second voltage transform blocks that for each of one of the respective first, second, and third motors, transforms a respective rotating two-axis coordinate system of the respective motor, based upon respective angular position of a respective rotor of the respective motor, to a respective set of space vector voltage signals in a respective stationary two-axis space vector coordinate system of a respective stationary stator of the respective motor;
whereby the one or more second voltage transform blocks produce the first, second, and third sets of space vector voltage signals.

18. A system comprising:
a first motor, a second motor, and a third motor, each respective motor comprising three phases;
a voltage source inverter circuit comprising multiple respective inverter legs;
a commutation control circuit including,
a first voltage transformation block to transform first, second and third sets of space vector voltage signals, corresponding to the first, second, and third motors, to multiple phase voltage signals that include a first shared phase voltage signal and a second shared phase voltage signal, and
a duty cycle block to modulate the first and second shared phase voltage signals and add a common mode voltage value to the first and second shared phase voltage signals to produce corresponding first and second input control signals;
wherein a first inverter leg of the voltage source inverter circuit is coupled to impart a first shared excitation signal to a third phase of the first motor and to a first phase of the second motor, in response to the first input control signal; and
wherein a second inverter leg of the voltage source inverter circuit is coupled to impart a second shared excitation signal to a third phase of the second motor and to a first phase of the third motor, in response to the second input control signal.

19. The system of claim 18,
wherein the multiple phase voltage signals include a first exclusive phase voltage signal;
wherein the duty cycle block modulates the first exclusive phase voltage signal and adds the common mode voltage value to the first exclusive phase voltage signal to produce a corresponding third input control signal; and
wherein a third inverter leg of the voltage source inverter circuit is coupled to impart a first exclusive excitation signal to only one phase of one motor, in response to the third input control signal.

20. The system of claim 18 further comprising:

one or more second voltage transform blocks that for each of one of the respective first, second, and third motors, transforms a respective rotating two-axis coordinate system of the respective motor, based upon respective angular position of a respective rotor of the respective motor, to a respective set of space vector voltage signals in a respective stationary two-axis space vector coordinate system of a respective stationary stator of the respective motor;

whereby the one or more second voltage transform blocks produce the first, second, and third sets of space vector voltage signals.

\* \* \* \* \*